(12) United States Patent
Foley

(10) Patent No.: US 12,118,515 B2
(45) Date of Patent: Oct. 15, 2024

(54) CONCEPT-BASED COLLABORATIVE MECHANISM

(71) Applicant: 9408-5735 Québec Inc., Sherbrooke (CA)

(72) Inventor: David Foley, Sherbrooke (CA)

(73) Assignee: 9408-5735 Québec Inc., Sherbrooke (CA)

( * ) Notice: Subject to any disclaimer, the term of this patent is extended or adjusted under 35 U.S.C. 154(b) by 41 days.

(21) Appl. No.: 17/841,278

(22) Filed: Jun. 15, 2022

(65) Prior Publication Data
US 2022/0405711 A1    Dec. 22, 2022

Related U.S. Application Data

(60) Provisional application No. 63/211,207, filed on Jun. 16, 2021.

(51) Int. Cl.
*G06Q 10/10* (2023.01)
*G06F 3/0484* (2022.01)

(52) U.S. Cl.
CPC ......... *G06Q 10/103* (2013.01); *G06F 3/0484* (2013.01)

(58) Field of Classification Search
CPC .......... G06Q 10/10–1097; G06Q 10/101–103; G06F 3/048; G06F 3/0484; H04L 12/18–1895; H04L 65/401–4053
See application file for complete search history.

(56) References Cited

U.S. PATENT DOCUMENTS

| | | | |
|---|---|---|---|
| 10,764,705 B2* | 9/2020 | Laaksonen | G06F 3/017 |
| 2015/0007058 A1* | 1/2015 | Wooten | H04L 67/131 |
| | | | 715/753 |
| 2015/0120836 A1* | 4/2015 | Koo | G06Q 10/10 |
| | | | 709/204 |
| 2016/0072858 A1* | 3/2016 | Heyne | H04L 67/025 |
| | | | 715/753 |
| 2019/0362312 A1* | 11/2019 | Platt | G06Q 10/10 |
| 2021/0042438 A1* | 2/2021 | Scheideler | G06N 5/022 |
| 2022/0108276 A1* | 4/2022 | Stringham | G06F 3/04817 |

OTHER PUBLICATIONS

Cañas, Alberto J., et al. "CmapTools: A knowledge modeling and sharing environment." (2004): 125-135. (Year: 2004).*

(Continued)

*Primary Examiner* — Liang Y Li
(74) *Attorney, Agent, or Firm* — Benoit&Cote Inc.; Mathieu Audet

(57) ABSTRACT

A graphical user interface for displaying and managing information structures, the graphical user interface comprising at least one Viewport, at least one concept space in the at least one Viewport and at least one container item displayed in the at least one concept space, the container item being adapted to include a concept space branch adapted to be connected to another concept space, wherein a user can interact with the at least one container item to create a link to an item, the interaction with the at least one container item comprising a zoom-in and a zoom-out function for respectfully increasing functions associated with the at least one container item or decreasing functions associated with the at least one container item.

19 Claims, 19 Drawing Sheets

(56) References Cited

OTHER PUBLICATIONS

Cañas, Alberto J., et al. Permissions and access control in CmapTools. Technical Report No. IHMC CmapTools Mar. 2003). Pensacola, FL: Institute for Human and Machine Cognition, 2003. (Year: 2003).*

Cañas, Alberto J., et al. "The network architecture of CmapTools." (2003). (Year: 2003).*

Cañas, Alberto J., et al. "Synchronous collaboration in CMapTools." Institute for Human and Machine Cognition (IHMC) (2003). ( Year: 2003).*

The Brain Forums. Mind Map Expanded View. TheBrain.Com. Feb. 3, 2016. <https://forums.thebrain.com/post/mind-map-expanded-view-7899047> (Year: 2016).*

CmapTools. "CmapTools Help". Nov. 7, 2020. <https://web.archive.org/web/20201107123115/http://cmap.ihmc.us/docs/cmaptools-help> (Year: 2020).*

* cited by examiner

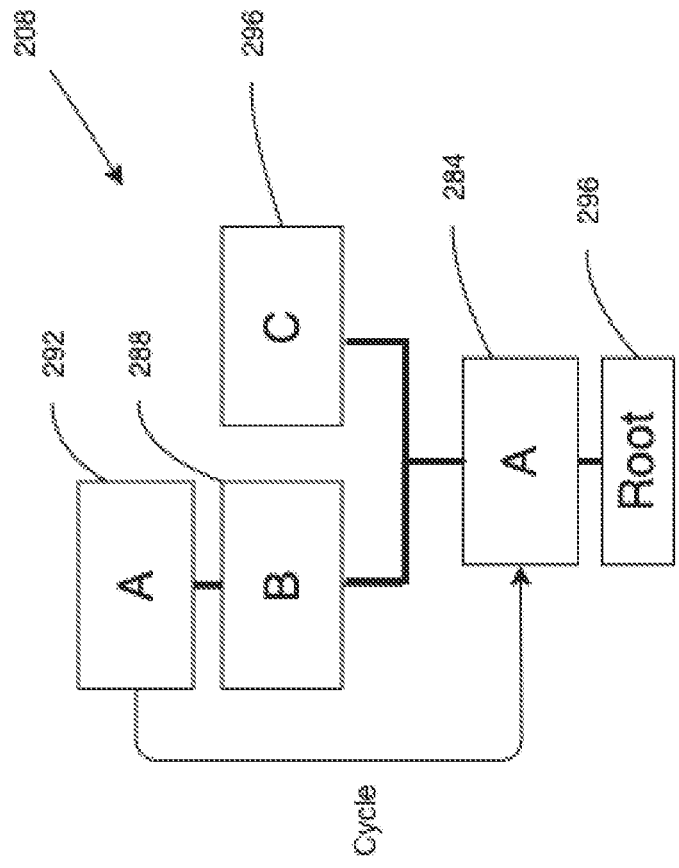
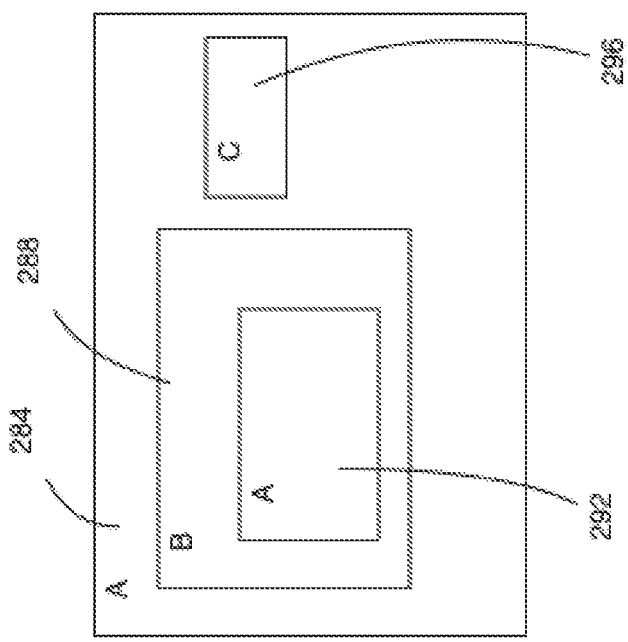
FIG. 13

CONCEPT-BASED COLLABORATIVE MECHANISM

CROSS-REFERENCE TO RELATED APPLICATION

This application claims priority from US provisional patent application 63/211,207 filed Jun. 16, 2021, the specification of which is hereby incorporated herein by reference in its entirety.

FIELD OF THE INVENTION

The present invention generally relates to the field of computer graphical interfaces for gathering information between collaborators. More precisely, the present invention relates to a concept-based collaborative mechanism for linking together various concepts based on their relation types.

BACKGROUND OF THE INVENTION

There are multiple computer technologies to gather all collaborators' information in a central place, but they mostly pertain to a work session or to a collaborative document, such as a whiteboard or meeting session. The information of a project is thus spread between multiple sessions. If a single session or document is used for a full project, it becomes overloaded by too much information and the structure of data for the whole team cannot be adapted to the collaborator's need, so to improve his ability to solve the part of the project he is assigned to.

Moreover, in-person meetings allow a bigger team to naturally form sub-conversations to develop ideas in parallel. In online meetings, when multiple participants talk at the same time, the audio quickly becomes a challenging issue, even getting incomprehensible. Online communication and collaboration tools such as Zoom™ or Microsoft Teams™ recreate sub-teams with breakout rooms that split the meeting into multiple smaller sessions. This solution does not replicate the process of in-person meetings, where sub-groups naturally form and morph depending on the subjects being discussed and interpellation from one conversation to members of other sub-groups. In-person meetings allow us to talk with a subset of the people while still keeping an open ear to other conversations that can be of some interest to move other ideas forward.

SUMMARY OF THE INVENTION

The present invention includes many aspects and features. The aforesaid and other objectives of the present invention are realized by generally providing a master Concept-Space-Graph operatively connected to one or more realms for sharing data.

Moreover, the invention disclosed herein, in accordance with embodiments thereof, solves this problem by leveraging data structured and presented in a semi-hierarchical fashion called Concept-Space. All information of a project can be organized in Concept-Space where concepts recursively contain more concepts, and where concepts from any levels can be linked together by different types of relations. According to embodiments of the invention, Concept with a space to contain other concept are Container items. Concept without such space are Object items. The top concepts can represent the most general aspects of the problem, and concepts inside them can be increasingly specific. The Concept-Space also contains editable documents, webpages, drawings, multimedia, annotations, emails, and any other work artefact that can also be linked together. Zooming-in navigates in the sub-concepts and gives a new infinite Concept-Space to work in. Zooming out navigates back to higher level concepts. The invention allows to keep and organise the full evolution of a project in a continuous multi-level Concept-Space.

A shared project with the afford mentioned Concept-Space can be created so that collaborators can work in it simultaneously in real-time. An audio and video stream can be added to capture each active participant and present them in the shared space. The structure of information makes it so that participants can elaborate on different subjects by creating new Concept-Spaces and moving in this new Concept-Space to elaborate more specific details. Additionally, the audio stream can have its volume changed proportionally to the hierarchical distance, so that participants in the same Concept-Space have higher audio-level between them, and the audio level of participants in a further hierarchical level is lower. By navigating in Concept-Spaces to join other collaborators, the invention allows to effectively replicate the dynamics of an in-person meeting. It is very easy to move between conversations and it is possible to keep an ear open or to contact someone from other conversations without making too much noise in the local conversation.

A user has a private Concept-Space where he can build and elaborate his own projects. A user can bring concepts from a shared project Concept-Space in his private space, and this action creates an "external Instance". External instance acts as a proxy to the remote shared concept, including its hierarchical content. The invention allows users to select and bring relevant concepts from the shared space and reorganize information around it in his private space in a way fit for the user' goals. All what is done inside the external instance is synchronized in real-time with the shared Concept-Space, and thus also with all other external instances in any user's space that have an external instance containing this change. The result is that the shared space can contain the most relevant structure and information for the whole team, each collaborator can elaborate additional data and structure around the shared information, particular to the problem they want to solve or personnel preference, and It becomes very easy to move or create data useful for the team, directly from the personnel space and without losing sight of this important information also in your private space.

At least one aspect of the present invention provides, in accordance with at least one embodiment thereof, a Presenter configured to include a set of Viewports to show and interact with one or more Concept-Space used to combine information, object items and container items.

At least one aspect of the present invention provides, in accordance with at least one embodiment thereof, a Viewport configured to contain the Concept-Space and provide navigation interactions and add information about the current position in the hierarchy of Concept-Spaces.

At least one aspect of the present invention provides, in accordance with at least one embodiment thereof, at least one Viewport containing shared Concept-Space from which can be shared one or more concepts, and possibly one Viewport containing private Concept-Space.

At least one aspect of the present invention provides, in accordance with at least one embodiment thereof, at least on private-instance of Concept-Space is own by a user and is displayed at least in the aforementioned user's graphical display in a shared Concept-Space, but is also visible to other users of the shared Concept-Space in accordance to rights given by the aforementioned user that owns the aforementioned private Concept-Space.

At least one aspect of the present invention provides, in accordance with at least one embodiment thereof, a zoom-in function to see sub-concepts with lower-level concepts that are recursively linked by relations.

At least one aspect of the present invention provides, in accordance with at least one embodiment thereof, object items and container items, object items can be converted into container items to contain additional items therein.

At least one aspect of the present invention provides, in accordance with at least one embodiment thereof, a Viewport adapted to display one or more concepts that can be either content entities or container entities.

At least one aspect of the present invention provides, in accordance with at least one embodiment thereof, a Viewport that is populated by any content entities or container entities that is dropped on it.

At least one aspect of the present invention provides, in accordance with at least one embodiment thereof, a linker associated with a concept and used to apply actions related to the concept within the Viewport of a user or between Viewports that can be owned by other or shared among more than one user.

At least one aspect of the present invention provides, in accordance with at least one embodiment thereof, a shared space where a plurality of collaborators can work simultaneously on one or more concepts.

In some aspects, the techniques described herein relate to a computer-implemented method of providing a collaborative User Interface (UI) on a computing device including a display, the computing device being operated by a first User, the method implemented on the computing device including: exchanging first collaborative data with a computerized system that maintains a first collaborative Concept-Space-Graph reachable by a first set of Users including the first User and first subset of Users; generating a Viewport to be displayed on the display of the computing device, the Viewport including a Concept-Space; having a first Item present in the Concept-Space, wherein the first Item is either a) a first collaborative Item associated to the first collaborative Concept-Space-Graph thus visible to Users of the first set of Users or b) an Item not associated with the first collaborative Concept-Space-Graph, thus visible to the first User but not visible to the Users of the first subset of Users; registering an operation performed by the first User on the first Item, wherein the operation is either visible or not by the Users of the first subset of Users based on the first Item being a first collaborative Item or not; and updating the first collaborative data based on the operation on the first Item only if the first Item is a first collaborative Item.

In some aspects, the techniques described herein relate to a method, further including providing a private Concept-Space-Graph storing private data reachable only by the first User$_{[DF1]}$; associating the private Concept-Space-Graph to the first Item, thus being therethrough a private Item; and updating the private data based on the operation on the first Item only if the first Item is a private Item.

In some aspects, the techniques described herein relate to a method, further including having the Concept-Space synchronized simultaneously with the first collaborative Concept-Space-Graph and the private Concept-Space-Graph, thereby having the Concept-Space being able to show at the same time first collaborative Items and private Items.

In some aspects, the techniques described herein relate to a method, further including providing a second collaborative Concept-Space-Graph storing second collaborative data, wherein the second collaborative Concept-Space-Graph is reachable by a second set of Users including the first User and second subset of Users; associating the second collaborative Concept-Space-Graph to the first Item; and updating the second collaborative data based on the operation on the Item only if the Item is associated with the second collaborative Concept-Space-Graph.

In some aspects, the techniques described herein relate to a method, further including having the Concept-Space synchronized simultaneously with the first collaborative Concept-Space-Graph and the second collaborative Concept-Space-Graph, thereby having the Concept-Space being able to show at the same time Items associated with the first collaborative Concept-Space-Graph and Items associated with the second collaborative Concept-Space-Graph.

In some aspects, the techniques described herein relate to a method, further including registering a graph change over the first Item performed by the User, wherein a graph change results in the first Item switching between a) the first Item not being associated with the first collaborative Concept-Space-Graph, thus the first Item being visible to the first User but not visible to the first subset of Users; and b) the first Item being associated with the first collaborative Concept-Space-Graph, the Item being visible to the Users of the first set of Users.

In some aspects, the techniques described herein relate to a method, wherein first collaborative data includes Other-User pointer data registered on another computing device operated by a User of the first subset of Users, wherein the method further includes displaying a pointer replicating movements of the Other-User pointer in the Concept-Space.

In some aspects, the techniques described herein relate to a method, wherein the first collaborative data includes one of a) audio stream, video data, text data, and execution code, and b) on graphic representation.

In some aspects, the techniques described herein relate to a method, further including having a second Item and a third Item; linking the first Item to the second Item; and linking the second Item to the third Item, therethrough having a linkage between the first Item and the third Item with the second Item being an intermediary Item in the linkage in the Concept-Space.

In some aspects, the techniques described herein relate to a method, further including having a fifth Item; and inserting the fifth Item in the second Item, therethrough having a linkage between the fifth Item and the third Item with the second Item being an intermediary Item in the linkage.

In some aspects, the techniques described herein relate to a method, further including computing a neighboring level based on determination of a minimum number of intermediary Items in a linkage.

In some aspects, the techniques described herein relate to a method, wherein the first collaborative data includes audio stream associated with each of the Items, the method including establishing the neighboring level for all linkages of Items of the Concept-Space; establishing an output level based on the neighboring level for each of the Items; generating an audio output for each of the linked Items based on their audio stream and modulated according to their output level; generating a combined audio output by combing the audio output of each of the audio streams of the linked Items; and playing the combined audio output on the computing device.

In some aspects, the techniques described herein relate to a method, further including generating a nth Item; and storing the nth Item in the first Item, wherein the step of updating the first collaborative data and the first collaborative data is based on the Item and the first Item and the nth Item being associated with the first collaborative Concept-Space-Graph or not.

In some aspects, the techniques described herein relate to a method, further including, upon the first User zooming in on the first Item over a threshold value, generating and displaying a new Concept-Space displaying the nth Item and not the first Item.

In some aspects, the techniques described herein relate to a method, wherein the step of generating the Viewport includes displaying another Concept-Space simultaneously with displaying the Concept-Space.

In some aspects, the techniques described herein relate to a method, further including having a second Item, wherein the first Item is associated with the first collaborative Concept-Space-Graph and the second item is not associated with the first collaborative Concept-Space-Graph, and linking the first Item to the second Item whereby generating a linkage between two Concept-Space-Graphs.

In some aspects, the techniques described herein relate to a method, wherein the first Item is a Container Item.

In some aspects, the techniques described herein relate to a data storage system including at least one computer-readable data storage medium, the at least one computer storage medium storing software instructions that, when executed by a processing unit is able to perform a method discussed hereinbefore.

BRIEF DESCRIPTION OF THE DRAWINGS

The above and other objects, features and advantages of the invention will become more readily apparent from the following description, reference being made to the accompanying drawings in which:

FIG. 13 is illustrating, in accordance with at least one embodiment thereof, a cycle in the data structure in a schematic representation of data structure on the right and a representation on the computer display on the left side;

DETAILED DESCRIPTION

Figure 1:
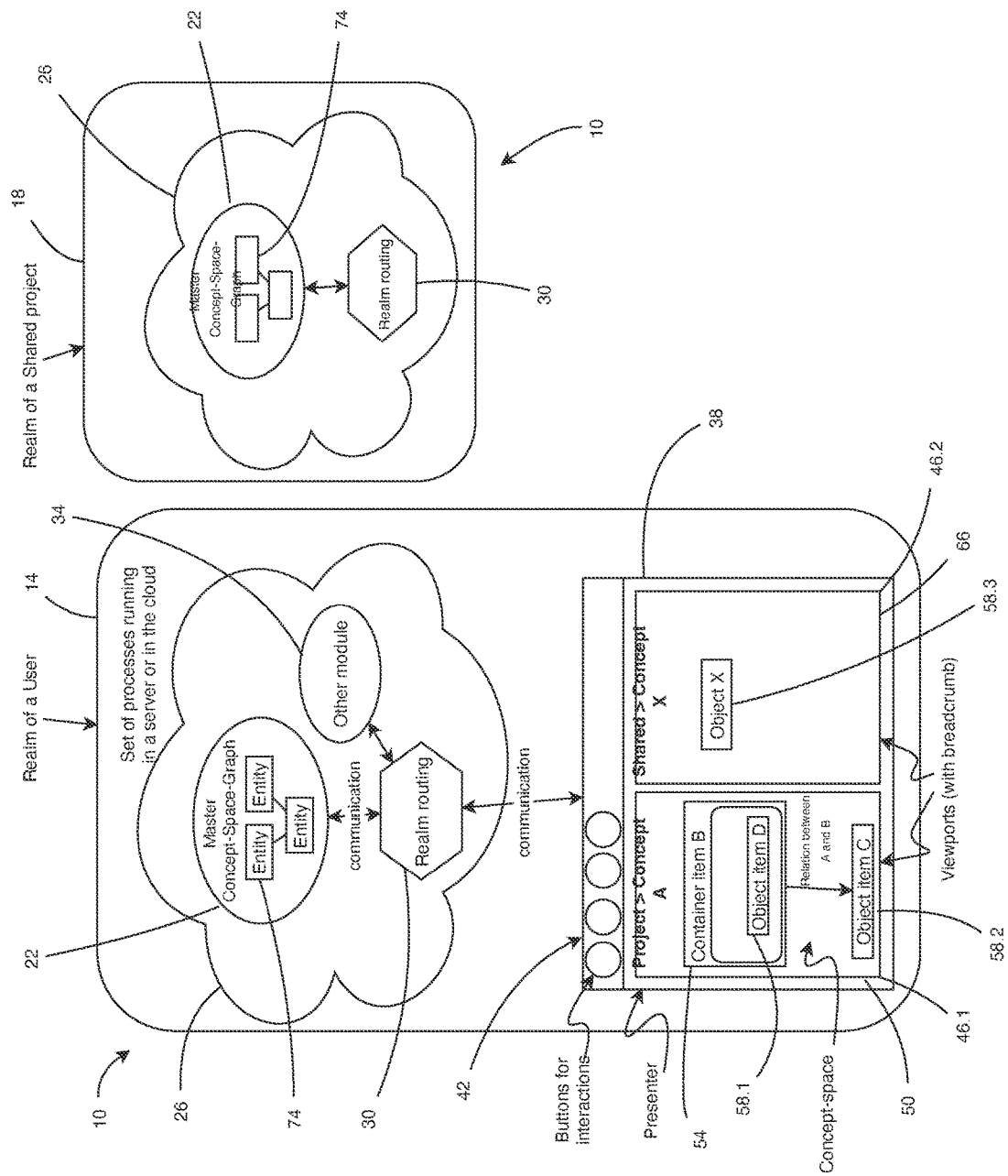
FIG. 1 is showing, in accordance with at least one embodiment thereof, a high-level schematic representation of a Realm of a user and a Realm of a shared project, each with a Master Concept-Space-Graph therein.

As a preliminary matter, it will be understood by one having ordinary skill in the relevant art ("Ordinary Artisan") that the invention has broad utility and application. Furthermore, any embodiment discussed and identified as being "preferred" is Considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention discloses herein; only one or a plurality of the features disclosed herein; or combination thereof. As such, many embodiments are implicitly disclosing herein and fall within the scope of what is regarded as the invention.

Accordingly, while the invention is described herein in detail in relation to one or more embodiments, it is to be understood that this disclosure is illustrative and exemplary of the invention and is made merely for purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. II is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein to that which the Ordinary Artisan would understand such term to mean bases on the contextual use of such term herein. To the extent that the meaning of a term used herein-as understood by the Ordinary Artisan based on the contextual use of such term-differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory Provision is intended to and should apply in the interpretation of such claim element. with regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers." "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese.".

Referring the drawings, one or more preferred embodiments of the invention are next described. The following description of one or more preferred embodiments is merely exemplary in nature and is in no way intended to limit the invention, its Implementations, or uses. Hence, a Concept-Space user interface in accordance with principles and embodiments of the present invention will be described herein after.

While illustrative and presently preferred embodiment(s) of the invention have been described in detail hereinabove, it is to be understood that the inventive concepts may be otherwise variously embodied and employed and that the appended claims are Intended to be construed to include such variations except insofar as limited by the prior Art.

For ease of understanding, the following elements are generally defined as identified below.

Master Concept-Space-Graph: A place in memory of a computer accessible by multiple users via a network where the Concept-Space-Graph is built and serves as the master source of data. All changes to data are sent to the Master Concept-Space-Graph, and the Master Concept-Space-Graph sends messages to all connected Presenters and all connected proxies to other Realms to notify them of this change. The Master Concept-Space-Graph is a module connected to the Realm.

Realm: The Realm is the set of modules and methods that are executed for a particular user or a particular shared project. The Realm comprises a routing method that redirects messages to the appropriate module or modules.

Presenter: A set of Viewports to display and interact with one or multiple Concept-Spaces. The Presenter comprises an interface comprising a set of buttons, menus and fields to create, remove, update and search Entities, and to configure the behavior of the Presenter. The Presenter is a module connected to the Realm.

Viewport: Viewport is a visual container for a Concept-Space. It is responsible for handling navigation and it adds information about the current position in the hierarchy of Concept-Spaces. Positional information is preferred shown through breadcrumb means or a tree view with expansion synchronized with the current Concept-Space shown in the Viewport. The Viewport can be in a standalone window, integrated in a web page, or in any type of UI container in an application. The preferred organization of Viewports is to have two of them in a split view displayed side by side.

Concept-Space-Graph: A Concept-Space-Graph is a structure comprising a combination of Entities (Model entities, Instance entities and Relation entities) that holds the information to build a Concept-Space. Concept-Space-Graph can also have multiple types of relations between Entities of various types, including but not limited to anyone of Model Entity, and Instance Entity.

Concept-Space: A Concept-Space is a visual space displayed on screen through a set of Items (Object items, Container items and Relation items). Visually, a Concept-Space is like a concept map, where any concept can be expanded to contain a concept-map. A Concept-Space has right status(es) associated therewith, and thus can be private and can extend to selected parts of Concept-Space of a remote concepts-space via external instances. A user can reorganize these external instances in his private Concept-Space. Changes done inside the external instance in the private Concept-Space are reflected in real time in the shared Concept-Space and other external instances connected to the same Concept-Space. Private instance can be placed by a user in a shared Concept-Space to provide access to private Concept-Space from the shared Concept-Space. Private instance access and visibility to other users of the shared Concept-Space is determined by the private owner. Private instance is typically visible and accessible only by the private owner.

Entity: An Entity is a set of information. Typically, an Item needs a Model entity and an Instance entity to have all information it needs to be generated and displayed on screen in the Viewport.

Model Entity: A model entity is the group of information pertaining to semantic data, such as name, description, file path or image data. It can also contain children's instances that should be part of defining the model. It does not have information about where it can be displayed in the Concept-Space.

Instance Entity: An instance entity is the group of information to place the Model entity somewhere in the Concept-Space or with some relation to another Model entity. It usually contains information about coordinate position in space or position in a list, and it has access to the data of the Model entity it refers to. It is possible to have multiple instances for the same Model, which produces synchronized view of the data in the Model.

Relation Entity: A Relation Entity can be considered a subtype of a Model Entity and is specially designed to hold information relating two or more Entities. The simplest relation is between two instance entities and produces a relation item that is an arrow between the items that represents each instance.

Item: An item is a visual representation of an Entity or of a combination of entities. Item typically uses data from a Model Entity and from an Instance Entity to display itself in a Concept-Space.

Object Item: An object item is any representation of information, such as documents, images, web-pages, text, drawings, videos, etc. Some object items can be expanded to become container items. Object Container Item: An item that has a space to contain other Object items and Container items. Container items need a Model entity and an Instance entity to be shown somewhere in a Concept-Space.

User: A person operating a computing device. Users may be set in groups or sets, of one or more. Sets may be divided in subsets, comprising one or more Users. Two sets may have none, one, some or all Users that are common to both sets.

Collaborative vs Private: quality referring to having more than one User having the potential to perform operation over an Item, or not.

FIG. 1 is illustrating a high-level system view with a plurality of realms 10, one being a Realm of a user 14 and the other a Realm of a shared project 18. The Realm of the user 14 contains a master Concept-Space-Graph 22 therein, which is in a computer accessible cloud 26 that also contains a Realm routing 30 and another module 34, for example. The Realm routing 30 is adapted to route communications between various elements of the system. The master Concept-Space-Graph 22 is operatively communicating with the Realm routing 30 that is also communicating, for instance, with another module 34 and the Presenter 38.

The Realm of the user 14 further includes the Presenter 38 equipped with a series of interaction buttons 42, some of which are for building, modifying, or navigating in the concept-map in FIG. 1. The Presenter 38, as embodies, includes a pair of Viewports 46.1 and 46.2. Viewport 46.1 includes a Concept-Space 50 in which is located a project of a user referred to as "Concept A". The Concept-Space 50 includes, for illustrative purposes, a container item 54 named B, which contains object item 58.1 named D. The Concept-Space 50 further includes a relation with object item 58.2 named C. Still referring to FIG. 1, the Presenter 38 further houses Viewport 46.2, which includes a shared Concept-Space 66 that is including an object item 58.3 named X. The master Concept-Space-Graph 22 in the cloud 26 can be considered a set of processes running on a server in the cloud 26 that is operatively connected to its Realm 18 via the Realm routing 30. One or more entities 74 are within the Master Concept-Space-Graph 22 and that same master Concept-Space-Graph 22 can be connected to many realms 14, 18, as illustrated in FIG. 1.

Figure 2:
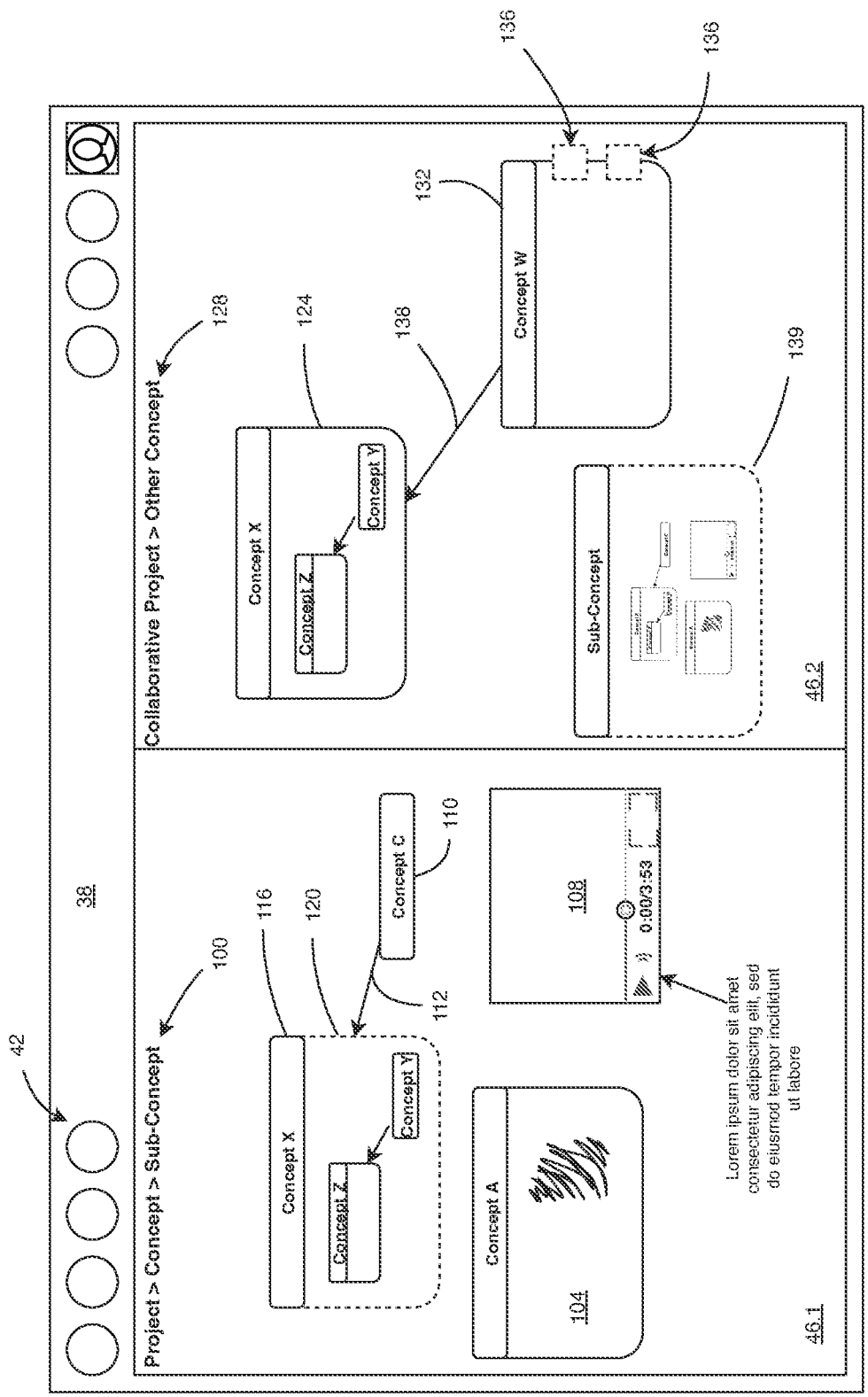
FIG. 2 is showing, in accordance with at least one embodiment thereof, a schematic graphical representation of Presenter with a private project Viewport and a collaborative project Viewport.

Turning now to FIG. 2, one can appreciate the Presenter 38 with Viewport 46.1 representing a project with two sub-levels, the level of concept and the lower level of sub-concept 100. The Viewport 46.1 includes a Container item for concept A 104 containing a drawing for illustrative purposes, and an Object item of a multimedia player 108, both in the Viewport 46.1 and not interconnected to other elements in the Viewport 46.1. Object item of Concept C 110 is in the Viewport 46.1, graphically represented with a solid contour line, and has a relation 112 to Container item of concept X 116, which displays an external instance 120 graphically represented with a dotted contour line. The concept X external instance 120 is providing a connection to concept X 124 found in the Viewport 46.2 containing a shared project 128. This Viewport 46.2 show concept W 132 with a graphical connector 138 to concept X 124 to show a relation. Only the children of Concept X 124 are synchronized in the external instance 120. Concept W 132 has Object entities that are attachments 136, which represent a different type of instance that are children of concept W 132. Private instance 139 provides a connection to synchronize with private Concept-Space displayed in Viewport 46.1.

Figure 3:
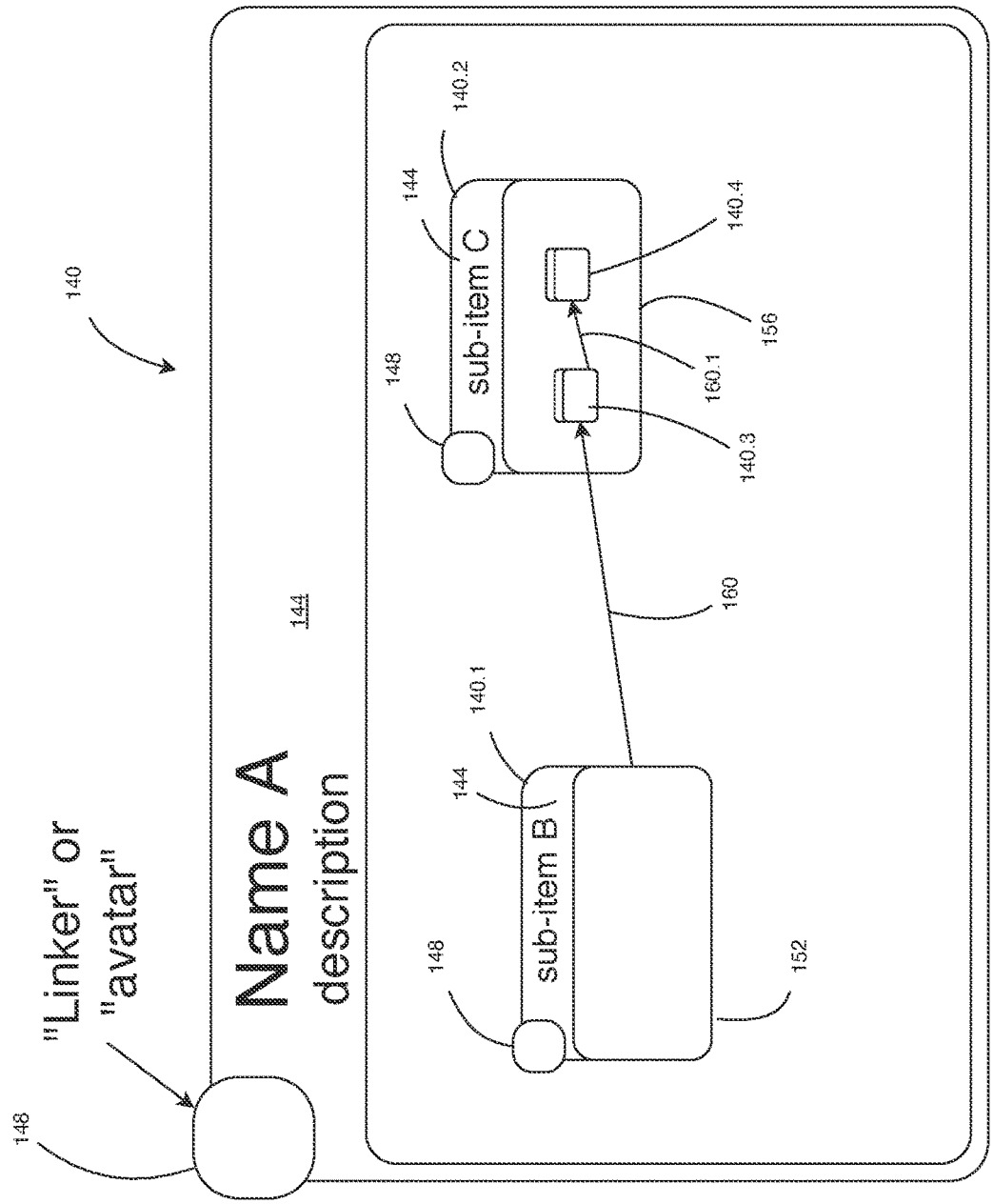
FIG. 3 is showing, in accordance with at least one embodiment thereof, a schematic Concept-Space including a linker and a pair of sub-items.

A Concept-Space 140 is illustrated in FIG. 3. The Concept-Space 140 is embodied as a rectangular window with a title portion 144 and a linker 148. The linker 148 can display visual information pertaining to the entity, one example is a check box in the case of an entity representing a task, where the checkbox is empty if the task is not done and where the checkbox is checked if the task is done. The linker 148 can be clicked to apply action depending on the type of entity, for example to toggle the state of a task entity between done and not done. The linker 148 can be moved to other space or on other items 140.2 to create or change the master-concept space. One such operation is to create a relation entity 160 by moving the linker from an item 140.1 to another item 140.3. The title portion 144 is configured as a label that can be modified manually or automatically in accordance with context. The concept 140 includes a sub-item B 152 and a sub-item C 156 that are interconnected with a graphical link 160. Graphical links 160 can carry relation and structure between concepts and can be different in each individual space. Sub-item B 140.1 is illustrated with no content therein. One can appreciate that sub-item C 140.2 contains two concepts 140.3, 140.4 interconnected together with graphical link 160.1. Sub-item 140.3 is operatively connected to sub-item B 140.1 with graphical link 160, showing that relation can be across levels.

Figure 4:
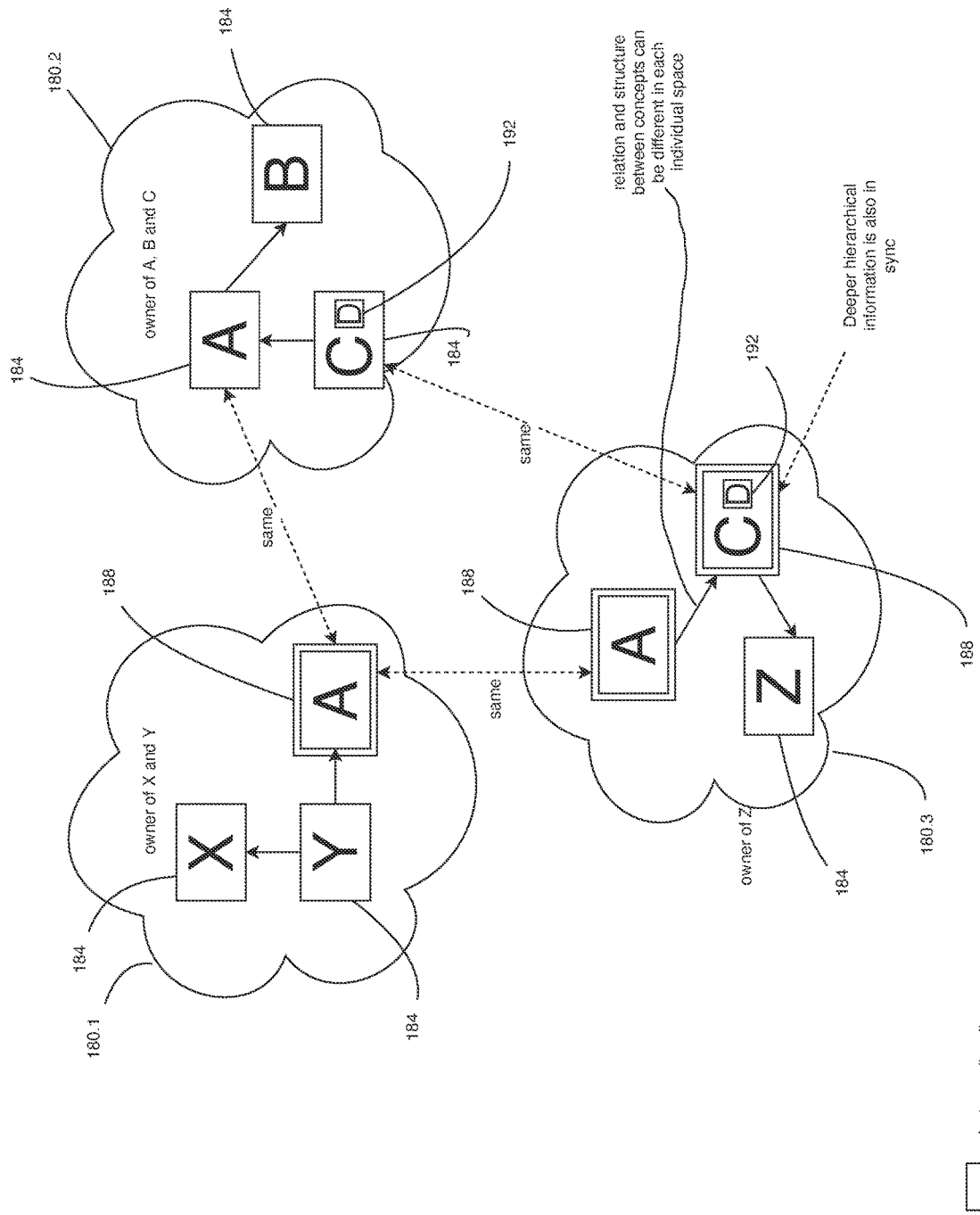
FIG. 4 is showing, in accordance with at least one embodiment thereof, a schematic view of three cloud systems with interrelations created by external-instances thereof.

Three cloud systems 180.1, 180.2 and 180.3 are illustrated in FIG. 4. Each cloud system 180.1, 180.2 and 180.3 contains several Model entities and Instance entities that can be either a local instance 184 or an external instance 188 that is allowing to create a proxy to a Concept-Space starting from an external Model entity. The Model entities are implicit in the representation of FIG. 4. Every local Instance entity 184 is associated to a local Model entity represented by a letter symbol. The owner of cloud system 180.1 is the owner of models and instances X and Y and of an external instance connecting to Model entity A, the owner of cloud systems 180.2 is the owner of models and instances A, B, C and D while the owner of cloud system 180.3 is the owner of model and instance Z and the owner of external instances connecting to Model entities A and C. Instances, external instances and model are owned by respective owners of the different cloud systems 180. An external instance 188 that loses its capacity to connect to the remote model 184 will become an empty instance, since it loses access to the source of data that is the Model entity. The owner of a model can have the possibility to remove access to any external instance 188. Local instance A from cloud system 180.2 places information of a model A, including all the children of model A, and external instance A in cloud system 180.1 and cloud system 180.3 are connected and display information of model A and all children of model A. Local instance C in cloud system 180.2 contains sub-instance D 192, representing a deeper hierarchical information, that is also shared with external instance C in cloud system 180.3 and remain in sync with the original sub-instance D 192 contained in local instance 184 C in cloud system 180.2.

Figure 5:
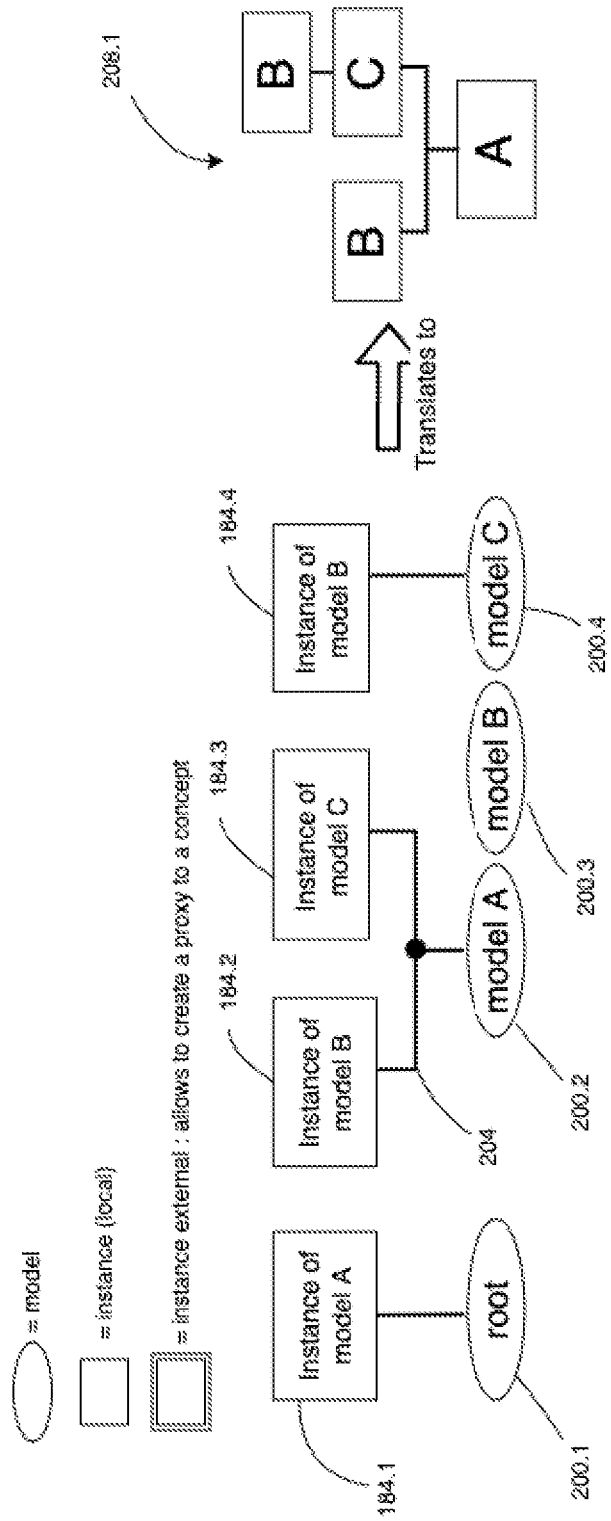
FIG. 5 is showing, in accordance with at least one embodiment thereof, a schematic view of a data structure model for ordering various instances of the models, and how it translates in a hierarchical data structure for drawing information on a display.
Figure 6:
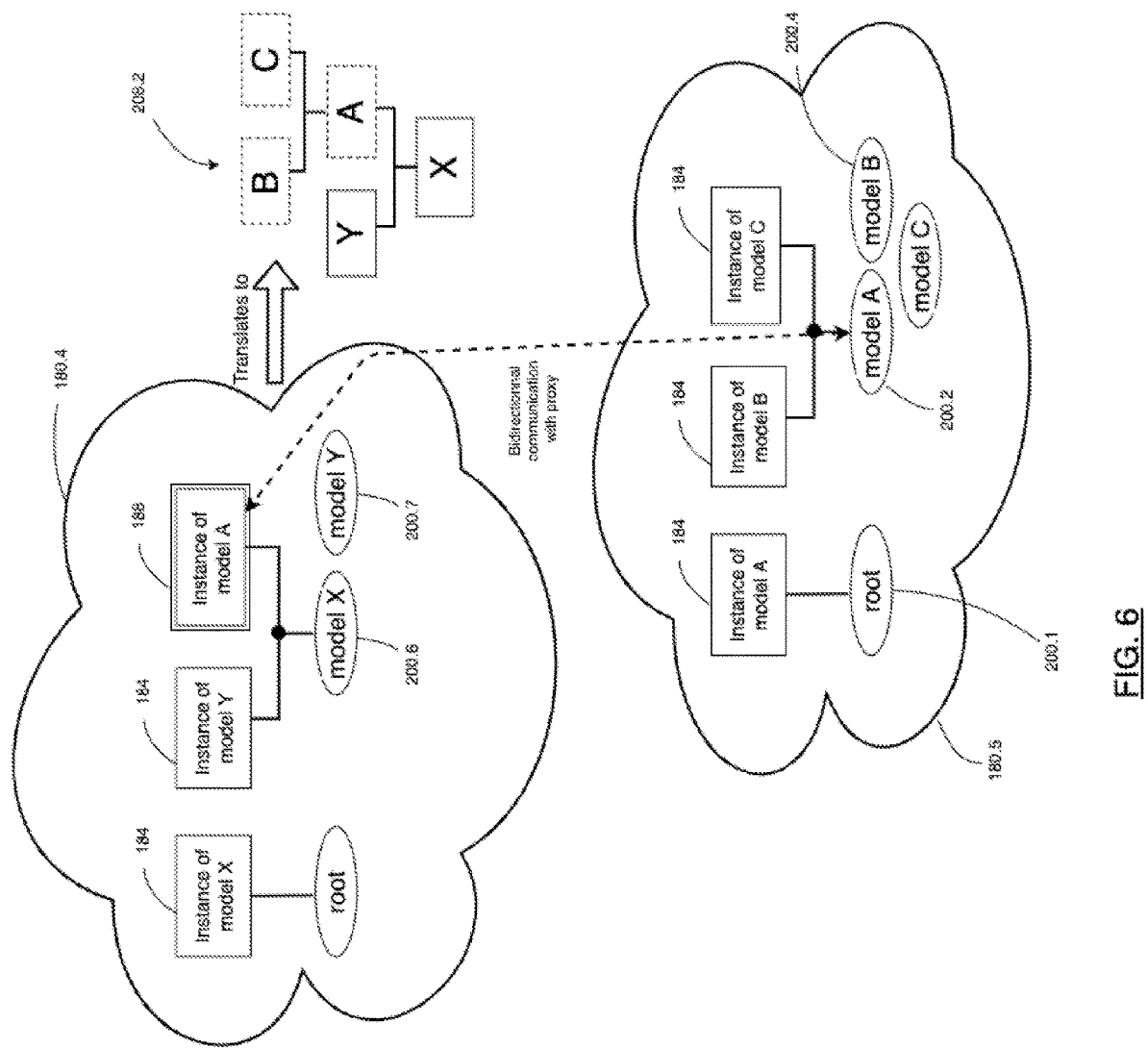
FIG. 6 is showing, in accordance with at least one embodiment thereof, a schematic view of a pair of cloud systems with their master Concept-Space connected by an external-instance, and the translation of such connection into a tree structure that is prepared to be drawn on a display screen.

The Concept-Space-Graph structure of Model entities 200 and Instance entities 184 is translated in a hierarchical structure of items 208 to be a Concept-Space displayed in a Viewport as illustrated in FIG. 5. Children instances 184 for a model 200 is represented with graphical links 204. The Master Concept-Space-Graph starts with a Model entity called root 200.1, which contains the instances of items to be displayed on the first level. In FIG. 5, root 200.1 contains an Instance entity 184.1 of Model entity A 200.2, that translate to a Container item for A 212.1 on the first level of the item structure 208.1. The Model entity A 200.2 contains an Instance entity 184.2 that refers to Model entity B 200.3 and an Instance entity 184.3 that refers to Model entity C 200.4 that translate to an Object item for B 212.2 and a Container item for C 212.3 in the second level of the item structure 208.1. Model B 200.3 as no children so it ends this branch. Model C contains an Instance entity 184.4 referring to Model entity B 200.3 that translates in an Object item for B 212.4 in the third level of item structure and inside Container item C 212.3. Model entity B 200.3 as no children, so it ends this branch. similar rational is applied in FIG. 6 with two cloud systems 180.4, 180.5. Model A is provided from cloud system 180.5 and is referred to by an external instance 188 in the cloud system 180.4. This external instance translates similarly to normal instance in the item structure 208.2. Dotted lines indicates that the external instance acts like a proxy to transfer information of Model A 200.1, and of Instances and models of B and C in a distinctive fashion.

Figure 7:
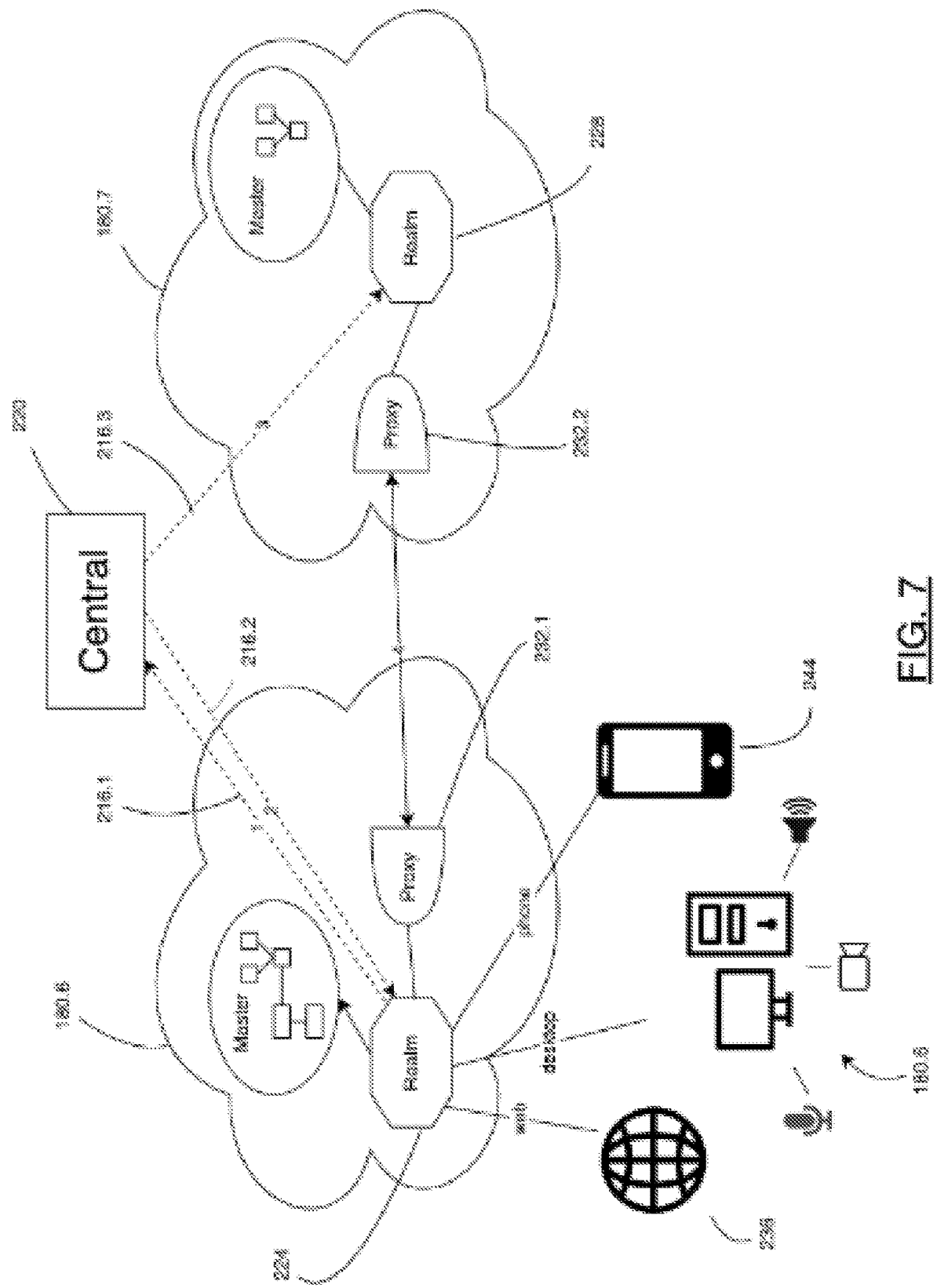
FIG. 7 is depicting, in accordance with at least one embodiment thereof, a central orchestrating the connection of proxy between a pair of cloud systems each hosting a different Realm.

FIG. 7 depicts the connection process between user Realm 224, and a Realm 228 that can be in different cloud system 180.6, 180.7, where a central 220 is orchestrating the connection. Realm 224 send a request 216.1 to central 220 asking to connect to Realm 228. Connection request can be triggered, but is not limited to, when opening a shared project from a user Realm, or when visiting an external instance. Central 220 verifies that this connection is authorized. In the case the connection is authorized, in one embodiment, central 220 then sends messages 216.2, 216.3 to realms 224 and 228 with information to create secure connection 230 that can receive and send information from both sides. Realm 224 use or create a proxy module 232.1 that connects to Realm 228, and Realm 228 use or create a proxy to complete the connection 230. The central 220 and Realm 224, 228 can decide to produce different type of connection depending on where each Realm's processes are being executed. Still referring to FIG. 7, Realm 224 is depicted with a plurality of connected Presenter modules implementing display and interaction functionalities pertaining to the invention, in a web browser 236, a computer 240, and a mobile device 244.

Figure 8:
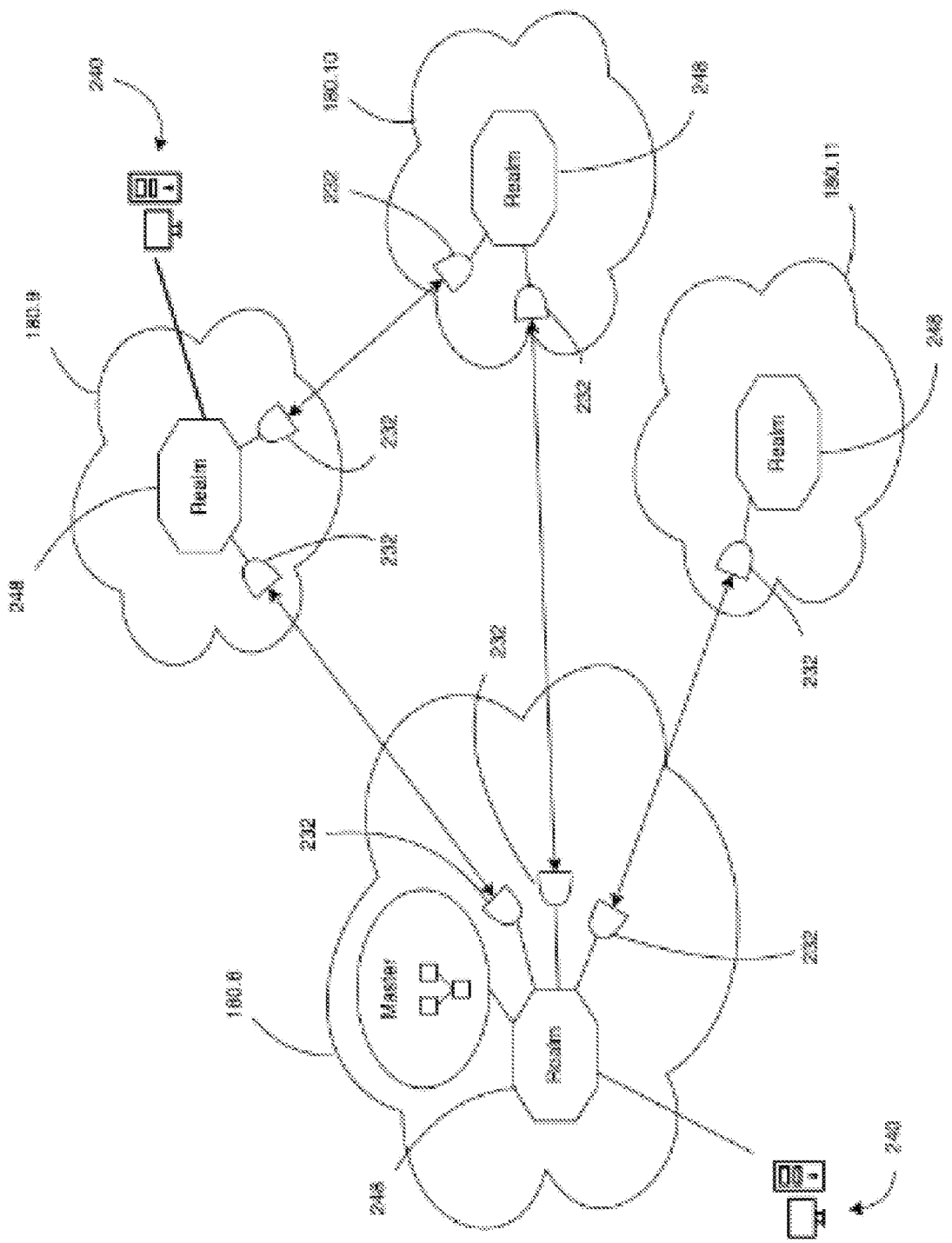
FIG. 8 is illustrating, in accordance with at least one embodiment thereof, a plurality of cloud systems interconnected together with proxies to distinct realms.

FIG. 8 illustrates that a plurality of realms 248 that can be in different cloud systems 180.8, 180.9, 180.10 and 180.11 can be connected to each other. Each cloud system 180 is equipped with respective Realm 248 all interconnected via proxies 232.

Figure 9:
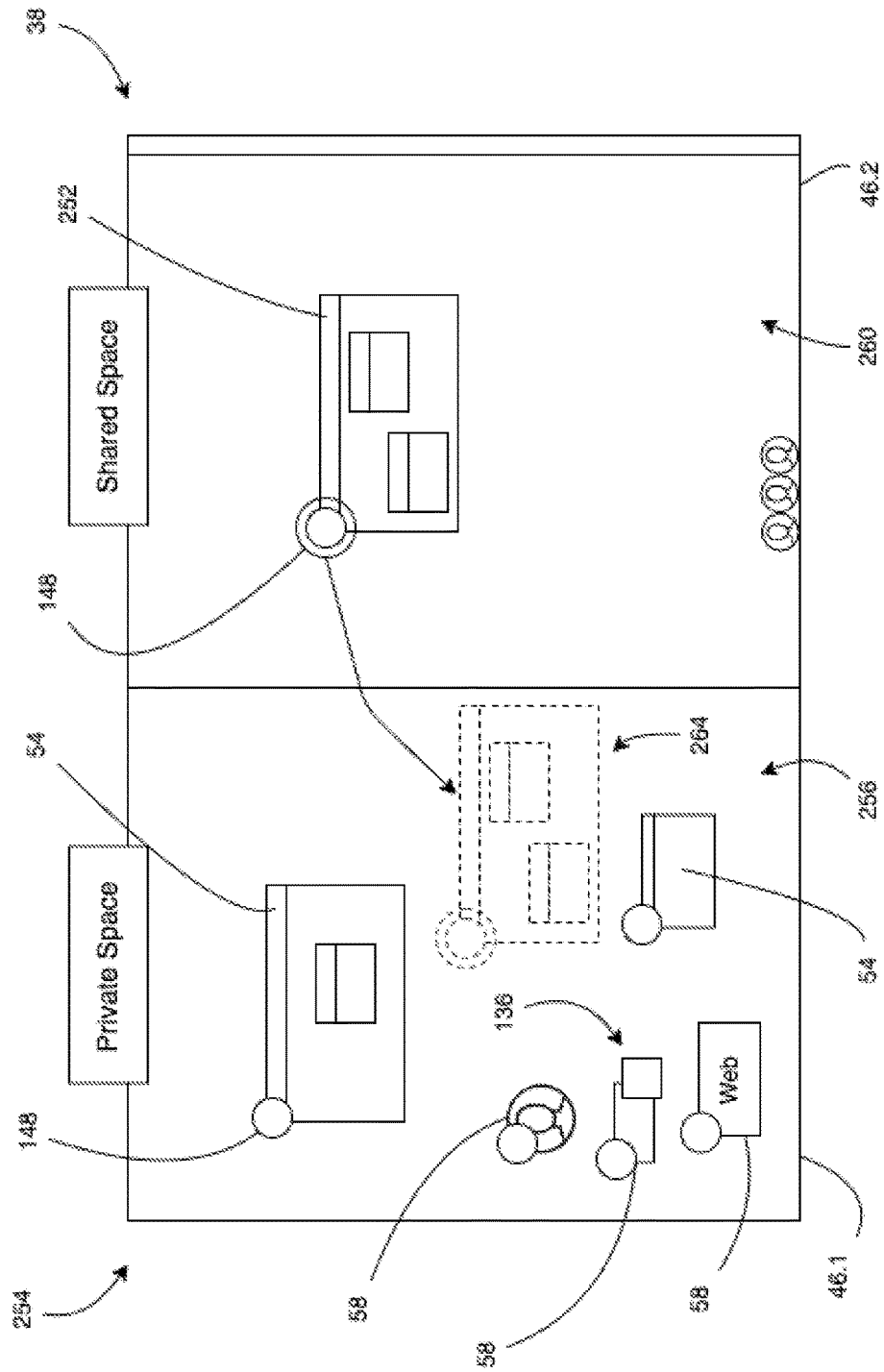
FIG. 9 is showing, in accordance with at least one embodiment thereof, the linker of a Concept-Space from a shared space, moved into a private space, which can create an external instance therein.

FIG. 9 is showing a possible embodiment for creating an external instance 264. A Viewport 46.1 showing a private Concept-Space 256 is displayed at the left while a Viewport 46.2 showing a shared Concept-Space 260 is displayed at the right of the Presenter 38. The linker 148 of a Container item 252 in a shared space is moved in any Container item 54 or in the current private space 256 of Viewport 46.1 to produce an external instance 264 at the position of the drop. The produced external instance 264 will display the Concept-Space 254 in the private Concept-Space 256. In a possible embodiment, the linker 148 is from a Container item or an Object item and is moved on any compatible Object entity or Container entity to produce an external instance that can show as an attachment 136.

Figure 10:
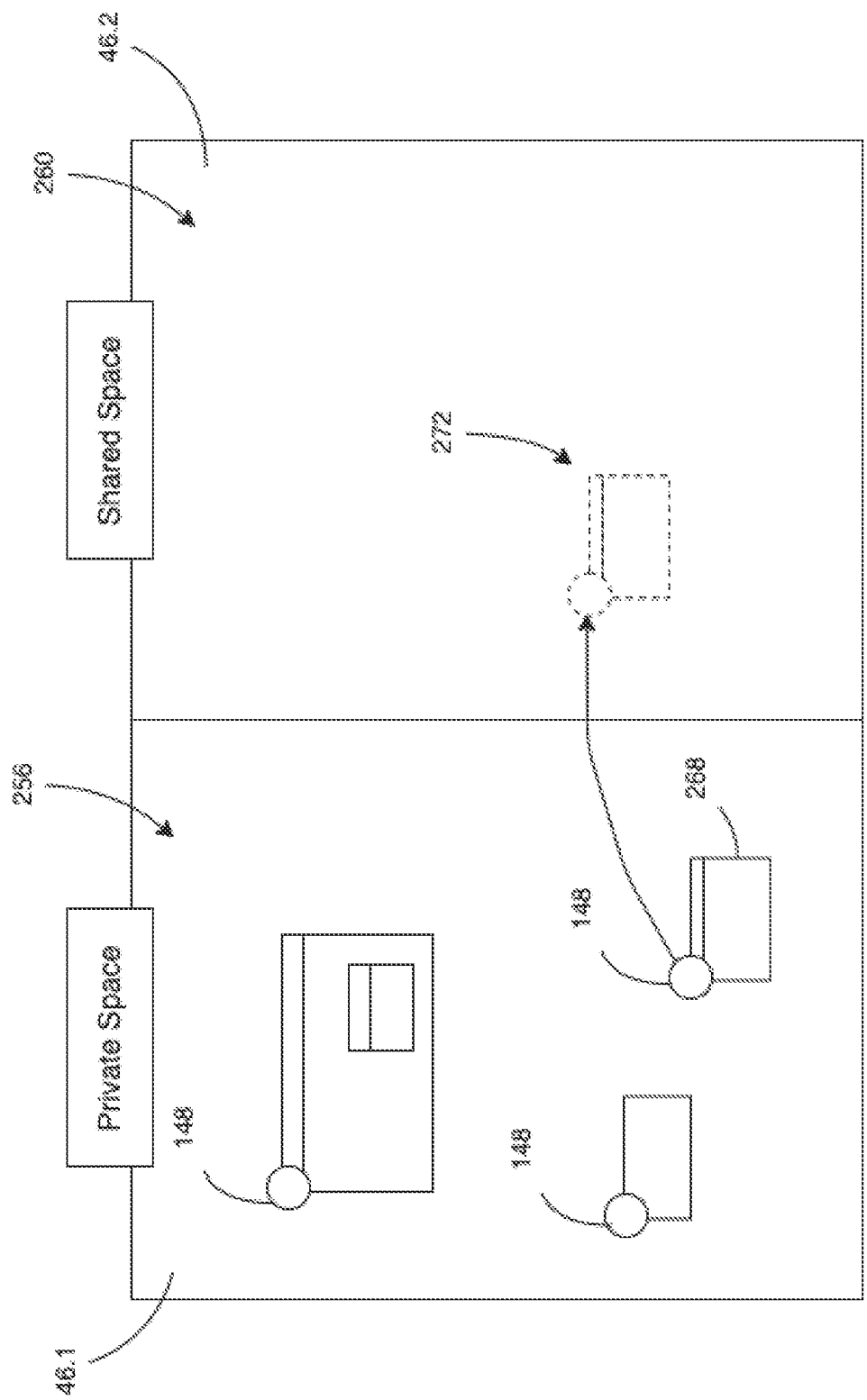
FIG. 10 is showing, in accordance with at least one embodiment thereof, the linker of a Concept-Space from a private space, moved into a shared space, which can create a copy therein.

FIG. 10 is showing a possible embodiment for publishing or copying an item from private space 256 to a shared space 260. The linker of item 268 in a private space 256 is moved in a shared space 260 and this action produces a full or partial copy 272 of the Concept-Space of item 268 in the shared Concept-Space 260. The original private version 268 can be removed and replaced by a new external instance (not shown) pointing to the new copy 272. The user can also choose to keep his own original private version 268, in which case the Concept-Space of 268 and 272 are not synchronized. The authorship is saved with the new shared version. In a possible embodiment, the whole item 268 can be moved to the shared space 260 to produce a copy 272 and remove the private version 268.

Figure 11:
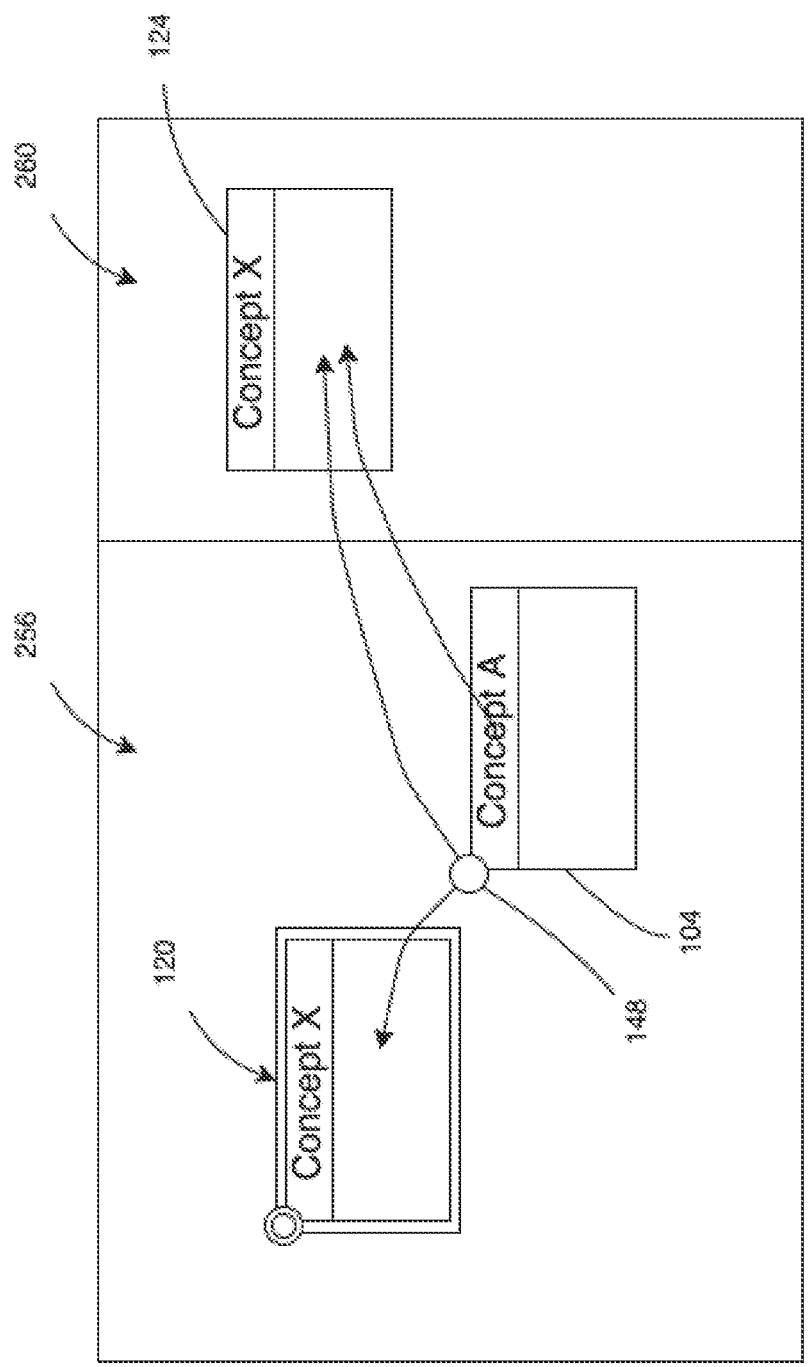
FIG. 11 is showing, in accordance with at least one embodiment thereof, a Concept-Space in a shared space, an external instance in a private space connected to the Concept-Space thereof, and another Concept-Space that can be manipulated into the external instance or into the connected Concept-Space in the shared space to produce the same action.

FIG. 11 illustrates that moving the linker 148 or the whole item 104 creates equivalent interaction when moved in an external instance 120 or in the instance 124 of the same model, here represented by named concept X, in the shared space 260 that own this model.

Figure 12:
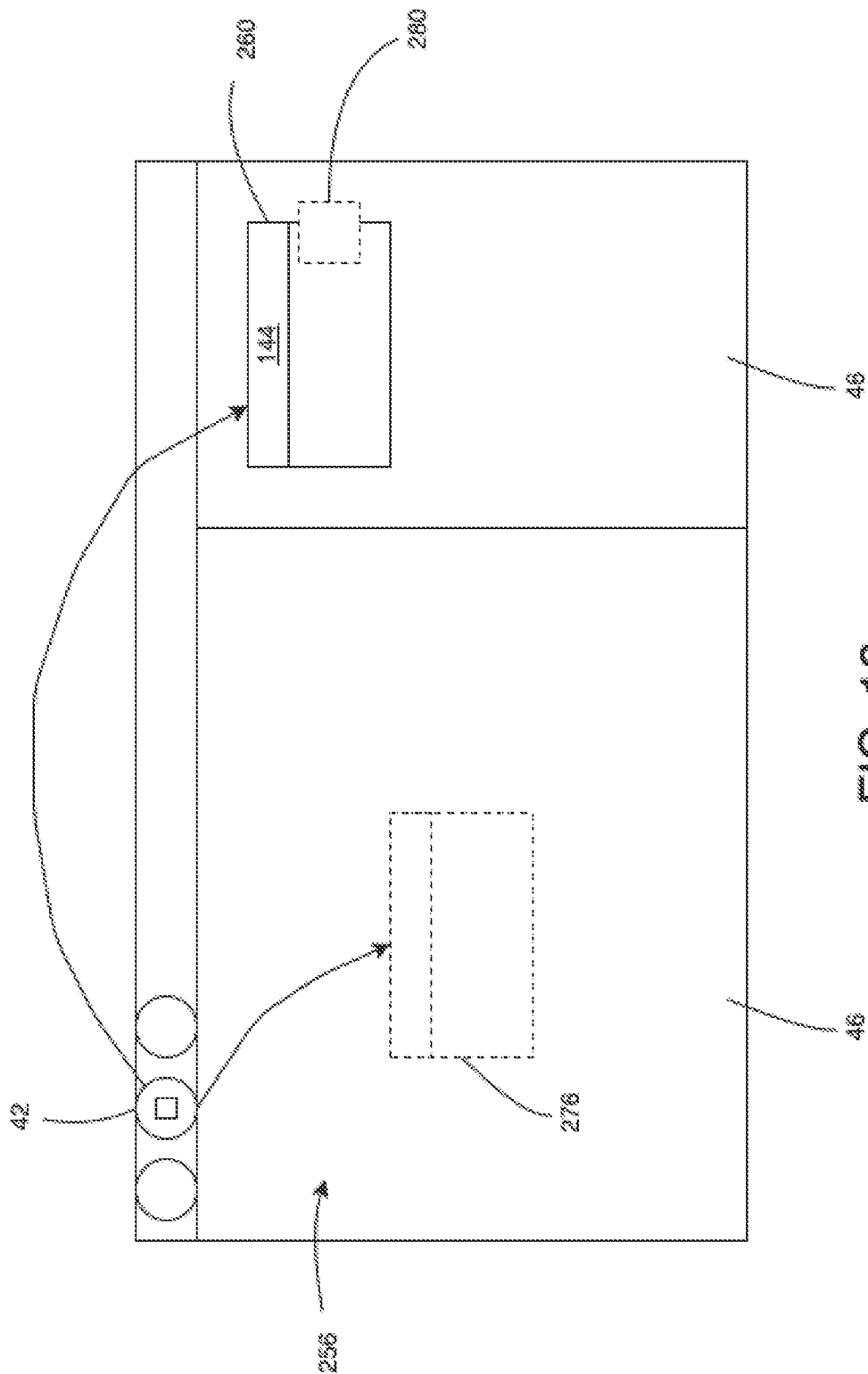
FIG. 12 is showing, in accordance with at least one embodiment thereof, a button moved in a first Viewport that can be a private space, and the same button also moved in a second Viewport that can be a shared space, that can produce the same result.

Similarly, FIG. 12 illustrate that interactions with buttons 42 are equivalent in any Viewport 46. Button 42 can be moved in space 256 or on the item title portion 144 to produce different actions. One such action from moving button 42 in space 256 is to produce a new entity shown as a new item 276 in the space 256, and one such action from moving button 42 on title portion 144 is to produce a new entity in the form of a new attachment item 280. Dotted lines 276, 280 are used to show the possible result of interactions described herein.

Figure 14:
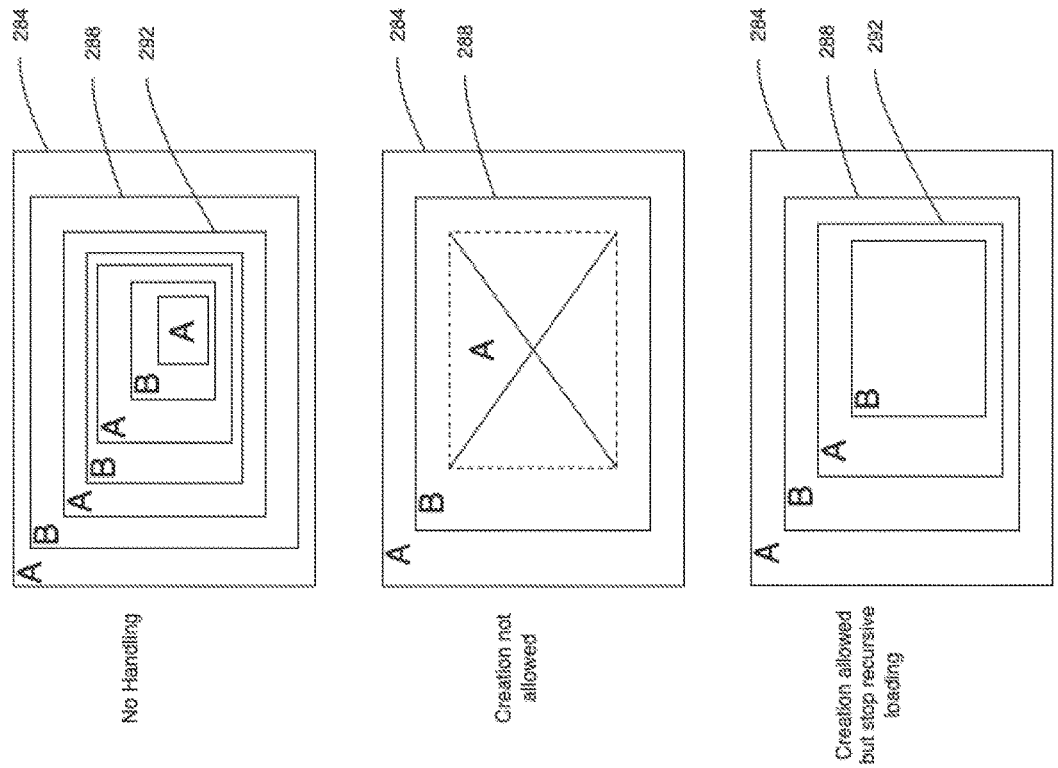
FIG. 14 is showing, in accordance with at least one embodiment thereof, a plurality of representation on the computer display for different rules to display a cycle in data structure.

FIG. 13 on the right illustrates in a schematic item structure 208, a case of a Model entity A having a first instance in root 296 producing item A 284. Model entity A contains an instance of model C producing item C 296 and an instance of model B producing item B 288. Most importantly for this demonstration, Model B contains a problematic instance of Model A producing item A 292 and producing a cyclic graph. No handling of such a situation creates an infinite recursion as shown in the top of FIG. 14 for the first iterations. The preferred handling of this situation is to detect the cycle before creating such instance and not allowing its creation, as illustrated in FIG. 14 in the middle, where item A with an "X" means that it is never created.

Another possible handling of the recursive loading is to detect the recursion and stop loading more then a given number of repetitions, as illustrated in FIG. 14 at the bottom.

Figure 15:
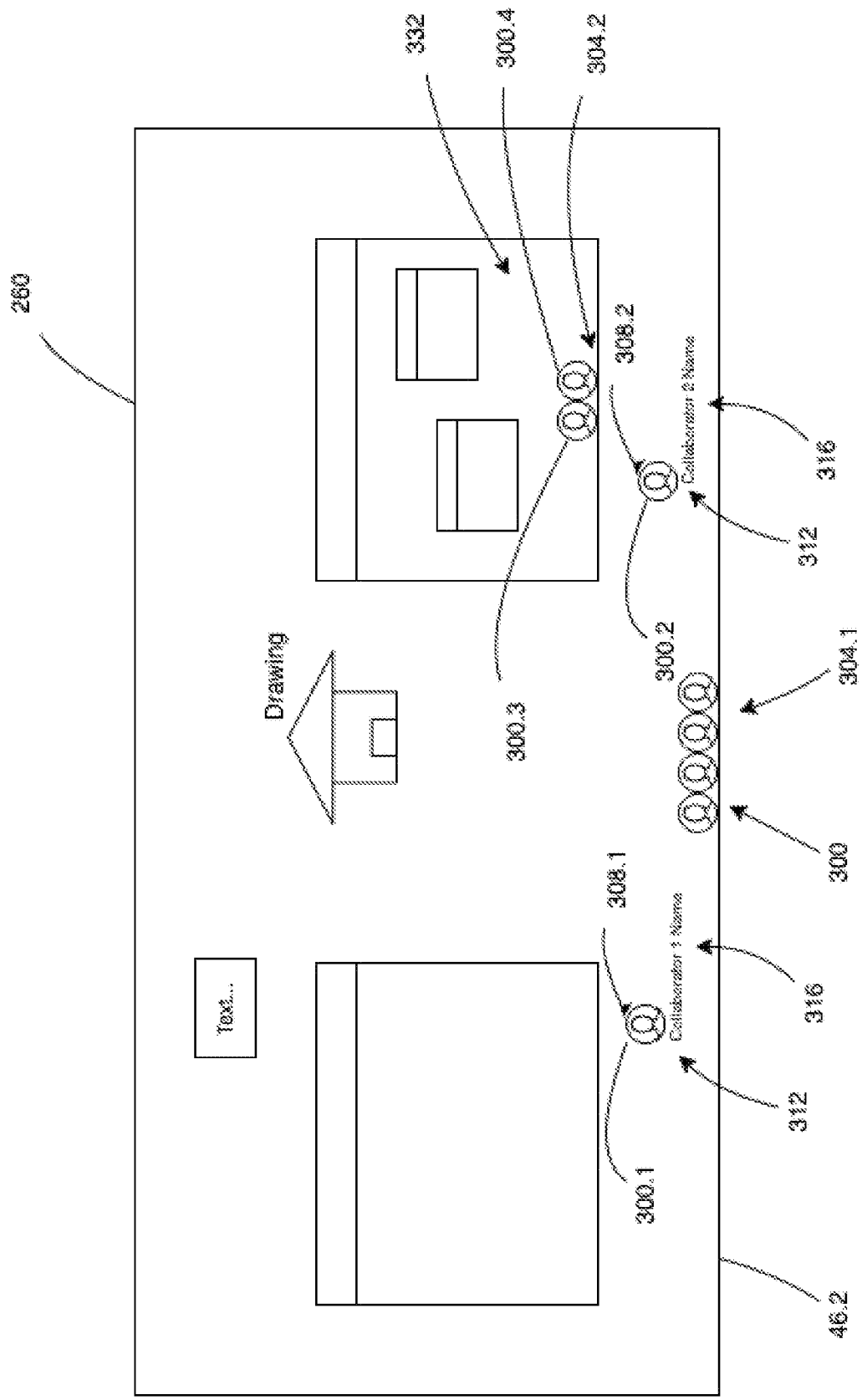
FIG. 15 is showing, in accordance with at least one embodiment thereof, a shared space a visual item that can show the cursor position of all collaborators, and a list of all collaborators at the bottom of the Viewport.

Moving to details of a shared space 260 when multiple users are working together as collaborators 300, FIG. 15 illustrate one possible embodiment of the presence system. All collaborators are shown in a list 304.1 at the bottom of the Viewport 46.2. The avatar can have visual cues, coloring, text or other that gives information about activity status. Avatars 312 with name 316 of collaborators 308.1, 308.2 in the current space 260 are animated to follow each collaborator cursor position in their own Presenter. It is possible to show animated cursor position up to a depth level and show static list of avatars 304.2 for deeper levels 332.

Figure 16:
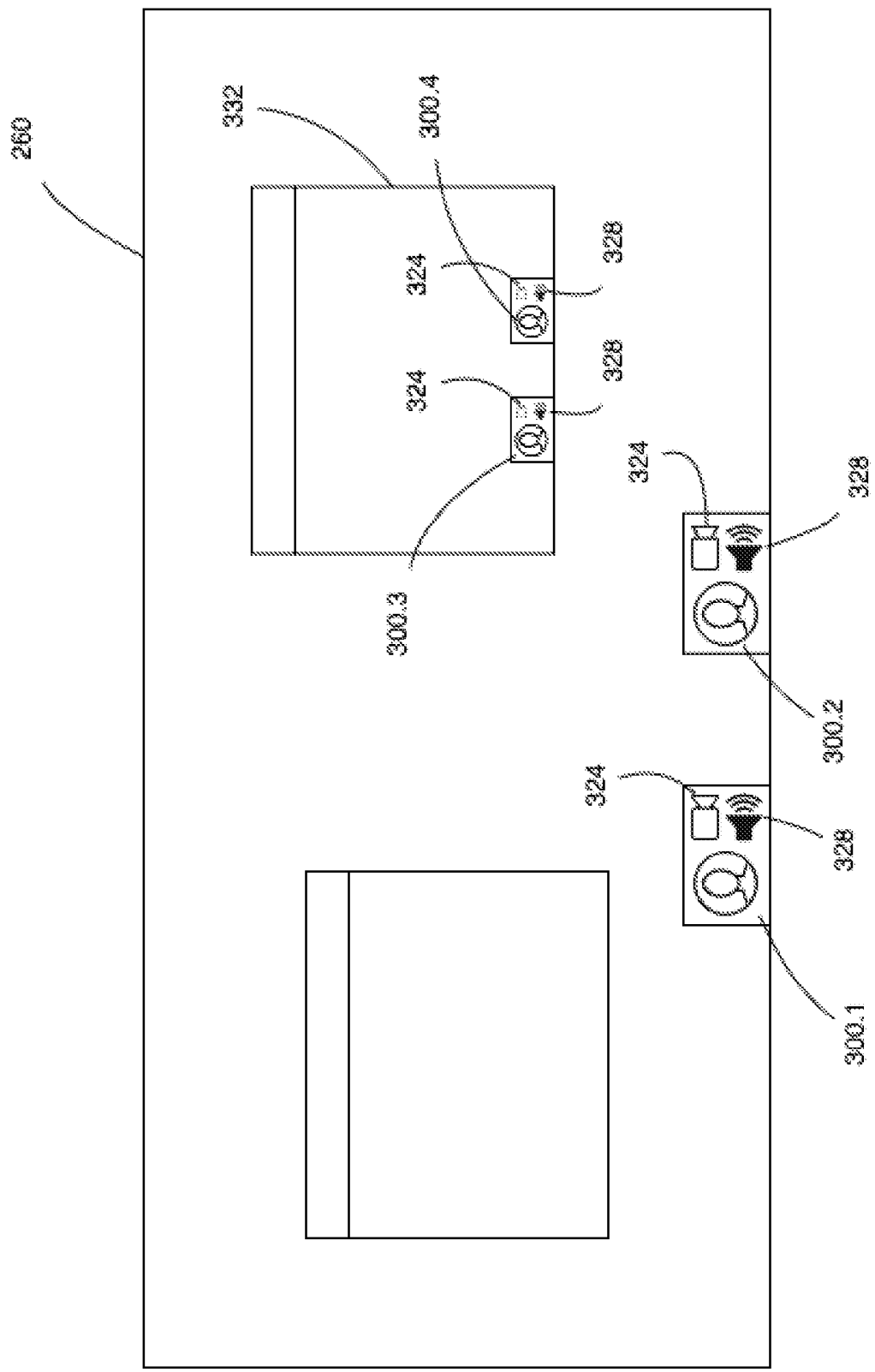
FIG. 16 is showing, in accordance with at least one embodiment thereof, a video and audio stream of participants in a shared space.

FIG. 16 illustrates that the presence system in shared space 260 can incorporate video 324 and audio 328 stream of the collaborators in the shared space 260. The video can replace the avatar 312 of FIG. 15 in some contexts. The audio stream can have its volume changed proportionally to the hierarchical distance, or neighboring level, between where user is in the item structure, so that participants in the same Concept-Space have higher audio-level between them, and the audio level of participants in a further hierarchical level is lower. In FIG. 16, participants 300.1 and 300.2 are in the same Concept-Space, and participants 300.3 and 300.4 are together in another Concept-Space. Participants 300.3 and 300.1 have one hierarchical distance between them and could choose to have a factor from 0 to 1 applied to the sound level between them.

Figure 17:
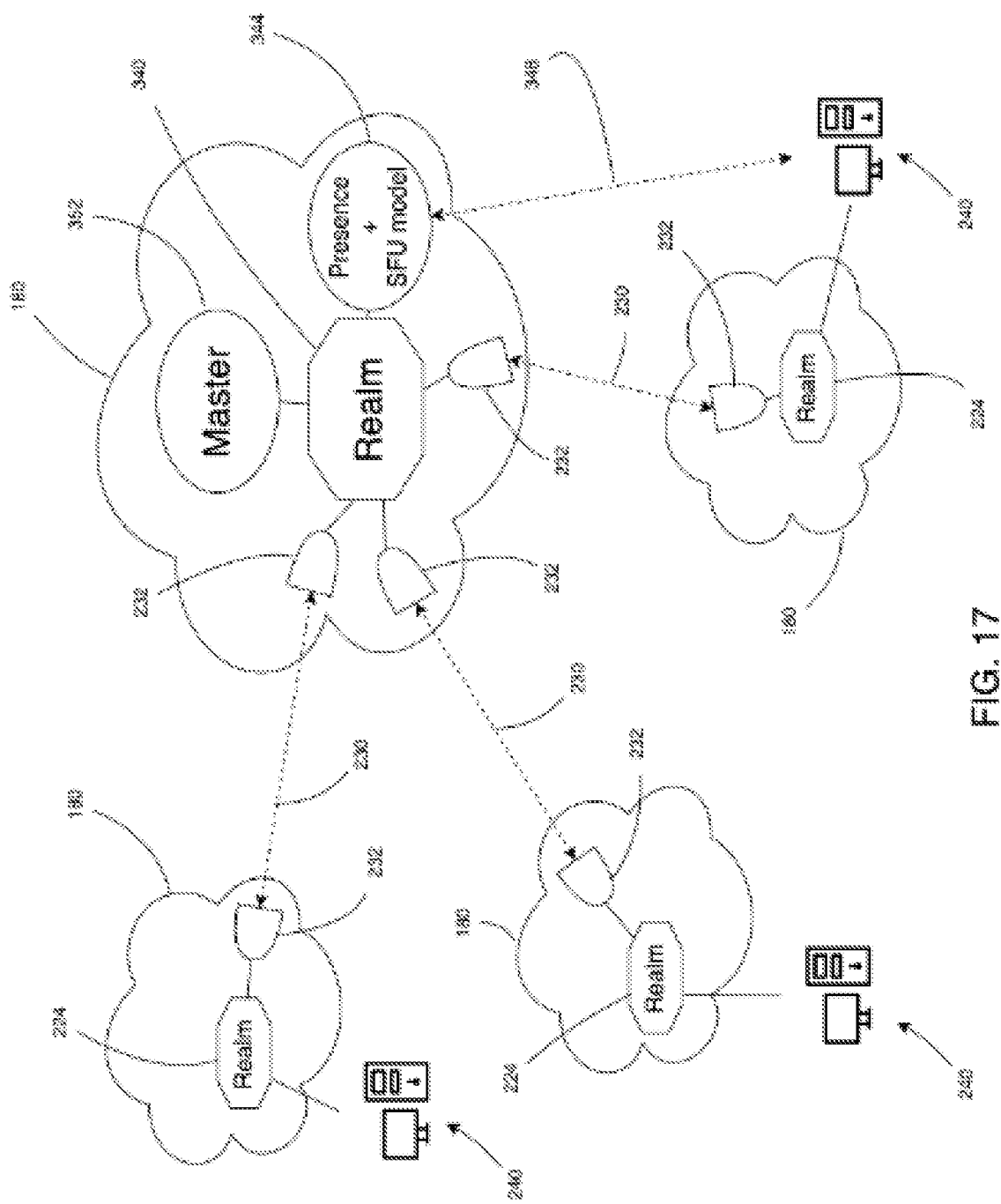
FIG. 17 is illustrating, in accordance with at least one embodiment thereof, a plurality of cloud with Realm, multiple private realms are connected on a shared Realm that contains a presence module, and that module can use a SFU (Selective Forwarding Unit) to transmit video and audio stream of each participant to each other participant.

Three user Realm 224 are connected to a shared Realm 340 in FIG. 17 to show architecture that allows presence system to handle cursor position, audio and video stream. The shared Realm 340 contains a presence module 344 that receives each participant presence information, that can be any combination of cursor position, audio and video. The presence module 344 can also calculate hierarchical distance in the shared Concept-Space 352 to modulate sound intensity between each participant 224. The proxy connections 230 can be used to transport some or all of this information. A direct connection between the user's device and the presence module can also be created 348, for example to avoid saturating the proxy connections 230. The presence Module 344 redistribute the presence information to all participant Realm 224, and these realms route the information to the Presenter that can be executed in a computer 240 to play display and reproduce the information to the user.

Figure 18:
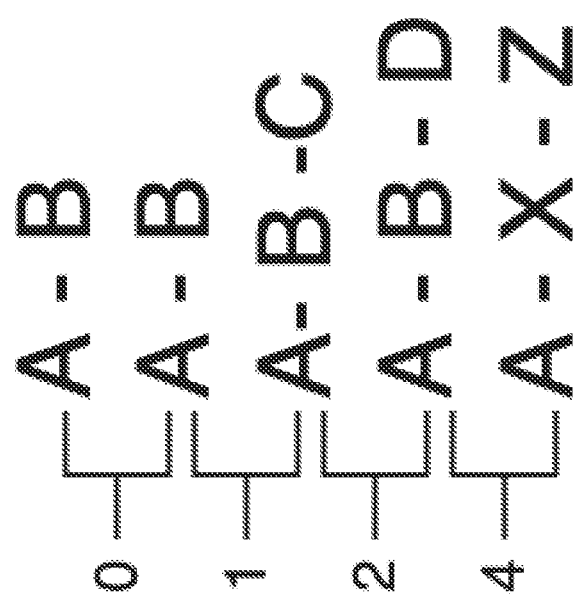
FIG. 18 is illustrating, in accordance with at least one embodiment thereof, hierarchical distances between position in a sequence of children Concept-Spaces.

FIG. 18 illustrates hierarchical distances between position in a sequence of children Concept-Spaces. The distance is the minimal number of navigations to go from one Concept-Space to the other. There is no distance between the first sequence as both users are in the same Concept-Space B. There is a distance of 1 between the second and third sequence, as the user in B needs to navigate forward one level to reach a sequence where he is in C. The distance between the third and forth sequences is 2, because a user in C must go back one level to B and then go forward one level in D. Similarly, sequences 4 and 5 have a distance of 4, because a user starting in D must navigate back two levels to reach A and then 2 levels forward to reach Z.

It is to be understood that the present collaborative system may be described as a method performed on a computing device operated by a User, wherein the steps of the methods are performed by the computing device. Such a method may be illustrated through FIGS. 19-#.

Figure 19:
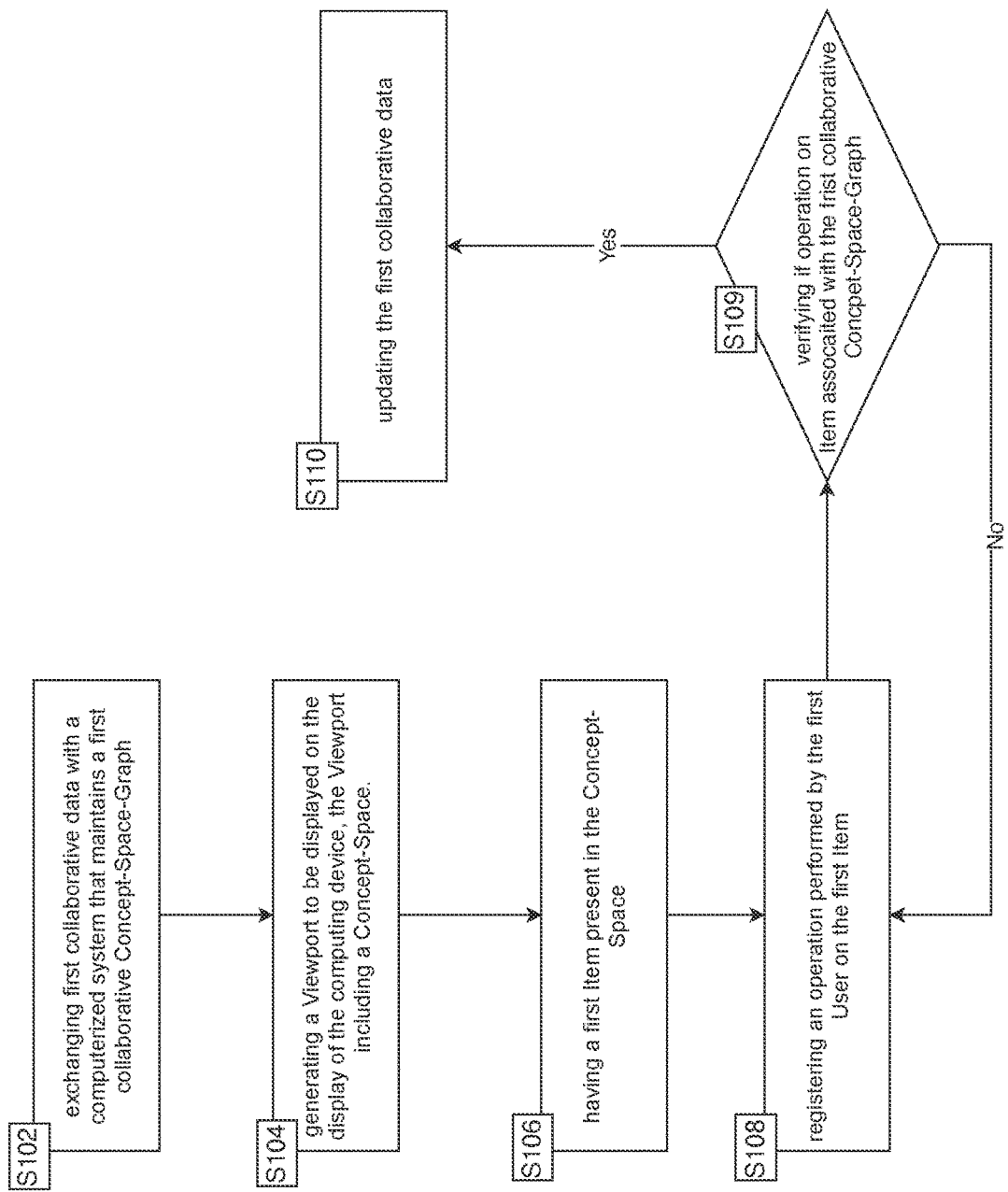
FIG. 19 is a flow chart depicting steps of a method performed by a computing device to provide a collaborative User Interface.

Referring to FIG. 19, the computer-implemented method of providing a collaborative User Interface (UI) on a computing device including a display, the computing device being operated by a first User. The method implemented on the computing device includes:

Step S102: exchanging first collaborative data with a computerized system that maintains a first collaborative Concept-Space-Graph reachable by a first set of Users including the first User and first subset of Users;

Step S104: generating a Viewport to be displayed on the display of the computing device, the Viewport including a Concept-Space.

Step S106: having a first Item present in the Concept-Space, wherein the first Item is either a) a first collaborative Item associated to the first collaborative Concept-Space-Graph thus visible to Users of the first set of Users or b) an Item not associated with the first collaborative Concept-Space-Graph, thus visible to the first User but not visible to the Users of the first subset of Users;

Step S108: registering an operation performed by the first User on the first Item, wherein the operation is either visible or not by the Users of the first subset of Users based on the first Item being a first collaborative Item or not;

Step S109: is a decision step based on whether the first Item being a first collaborative Item or not; and Step S110: updating the first collaborative data based on the operation on the first Item only if the first Item is a first collaborative Item.

According to embodiments, Items not associated with the first collaborative Concept-Space-Graph may be associated with a private Concept-Space-Graph storing private data reachable only by the first User.

Accordingly, regardless of providing a single Viewport, the displayed Concept-Space may comprise collaborative Items and private Items each stored in their corresponding Concept-Space-Graphs and that are maintained and thus synchronized simultaneously in parallel.

According to embodiments, the Items may be associated with two distinct collaborative Concept-Space-Graphs each having their respective collaborators able to view, create and modify Items in their collaborative Concept-Space-Graph. Accordingly, some collaborators, as the own operating the computing device discussed here, may be able to see all Items while other may have limited view/access to Items in one of the two collaborative Concept-Space-Graphs, and potentially others collaborative Concept-Space-Graphs and/or a private Concept-Space-Graph.

The method may further include registering a graph change over the first Item performed by the User, (through use of a menu, use of a contextual menu, a drag operation, etc.) wherein a graph change results in an Item switching from a first Concept-Space-Graph to a second Concept-Space-Graph.

As discussed before, collaborative Concept-Spaces may present real-time operations of other collaborators. Therefore, the method may comprise to display in real time pointer actions of other collaborators communicated through the data exchanged with the computerized system housing the collaborative Concept-Space-Graph.

In embodiments, data exchanged with the computerized system housing the collaborative Concept-Space-Graph may include audio stream, video data, text data, execution code, and/or graphic representation.

With a schematic of the outcome depicted on FIG. 18, the method may comprise linking Items, therefore defining direct and indirect linkages between Items potentially comprising intermediary Item(s) in the linkage(s) in the Concept-Space. Linkages may consist of relationships between distinct Items associated with the same Concept-Space-Graph or with different Concept-Space-Graphs, or inset relationship (an Item being a container for another Item) between Items associated with the same Concept-Space-Graph or with different Concept-Space-Graphs.

Accordingly, the method may further comprise to compute a minimum number of intermediary Items in a linkage as the neighboring level between two Items.

According to embodiments, modulated audio streams are provided based on the neighboring level between Items, wherein the closer they are, the louder is played the audio stream. Thus the method comprises establishing the neighboring level for all linkages of Items of the Concept-Space; establishing an output level based on the neighboring level for each of the Items; generating an audio output for each of the linked Items based on their audio stream and modulated according to their output level; generating a combined audio output by combing the audio output of each of the audio streams of the linked Items; and playing the combined audio output on the computing device.

In embodiments, the method further provides the option to the User to zoom in on an Item being a container form another Item, and, above a threshold value, generating and displaying a new Concept-Space displaying the other Item and not the first Item and the other Items that would have been present in the prior Concept-Space, thus allowing the User to concentrate on the Item(s) previously contained (concept schematically depicted on FIG. 14).

It is worth nothing that the method associated with playing audio stream may process differently linkages that are inset in the displayed Concept-Space than linkages that are outside, i.e. containing, the Concept-Space. The latter in some embodiments may temporarily disregarded. Accordingly, in embodiments, a zoom-in operation may be an option for a User to cut off some audio streams to obtain a collaborative environment where it is easier to concentrate.

It is worth noting that the displaying a Viewport in the present method may comprise displaying a single Concept-Space, or displaying a plurality of Concept-Spaces simultaneously, for example to display two Concept-Spaces side-by-side, with the option to drag Items between the Concept-Spaces and thereby potentially changing the associated of the dragged Item with a Concept-Space-Graph.

It is also worth noting that the present method allows, as discussed before, to generate linkages between Items, wherein the linkages may be over Items associated with the same Concept-Space-Graph, and over Items of different Concept-Space-Graphs.

It is finally worth noting that even though the term Item is used hereinbefore in relation with the method, an Item is by default a Container Item configured to hold data/Items of any of a plurality of nature and formats, including e.g., another Container Item, data that is viewable only, data that can be edit but not erased by someone else than the owner of the data, and erasable data, etc.

It is finally worth nothing that it is also herein described a data storage system including at least one computer-readable data storage medium configured for storing software instructions that, when executed by a processing unit, are adapted for the processing unit to be able to performed the method described herein.

It is also described a host method comprising hosting and maintaining a Concept-Space-Graph on a computerized system, and exchanging data with one or more computing device performing the method described before, whereby providing a collaborative backbone for these computer devices.

While preferred embodiments have been described above and illustrated in the accompanying drawings, it will be evident to those skilled in the art that modifications may be made without departing from this disclosure. Such modifications are considered as possible variants comprised in the scope of the disclosure.

What is claimed is:

1. A computer-implemented method of providing a collaborative User Interface (UI) on a computing device comprising a display, the computing device being operated by a first User, the method implemented on the computing device comprising:
   exchanging first collaborative data with a computerized system that maintains a first collaborative Concept-Space-Graph reachable by a first set of Users comprising the first User and first subset of Users;
   generating a Viewport to be displayed on the display of the computing device, the Viewport comprising a first Concept-Space comprising a title, a linker being a relation entity, the linker being movable between a plurality of Concept-Spaces, with the first Concept-Space operating as a container able to contain a plurality of items comprising a second Concept-Space;
   having a first Item present in the first Concept-Space, wherein the first Item is either a) a first collaborative Item associated to the first collaborative Concept-Space-Graph thus visible to Users of the first set of Users or b) an Item not associated with the first collaborative Concept-Space-Graph, thus visible to the first User but not visible to the Users of the first subset of Users;
   registering an operation performed by the first User on the first Item, wherein the operation is either visible or not by the Users of the first subset of Users based on the first Item being a first collaborative Item or not; and
   updating the first collaborative data based on the operation on the first Item only if the first Item is a first collaborative Item,
   wherein the first collaborative data comprises one of a) audio stream, video data, text data, and execution code, and b) graphic representation,
   the computer-implemented method further comprising:
   having a second Item and a third item;
   linking the first Item to the second item; and
   linking the second Item to the third Item, therethrough having a linkage between the first Item and the third Item with the second Item being an intermediary Item in the linkage in the Concept-Space;
   having a fifth Item;
   inserting the fifth Item in the second Item, therethrough having a linkage between the fifth Item and the third Item with the second Item being an intermediary Item in the linkage;
   computing a neighboring level based on determination of a minimum number of intermediary items in a linkage,
   establishing a neighboring level for all linkages of items in the first Concept-Space;
   establishing an output level based on the neighboring level for each of the items;
   generating an output for each of the linked items modulated according to their output level;
   generating a combined output by combining the output of each of the linked items; and
   providing the combined output on the computing device.

2. The method of claim 1, further comprising
   providing a private Concept-Space-Graph storing private data reachable only by the first User;
   associating the private Concept-Space-Graph to the first Item, thus being therethrough a private Item; and updating the private data based on the operation on the first Item only if the first Item is a private Item.

3. The method of claim 2, further comprising having the first Concept-Space synchronized simultaneously with the first collaborative Concept-Space-Graph and the private Concept-Space-Graph, thereby having the first Concept-Space being able to show at the same time first collaborative Items and private Items.

4. The method of claim 1, further comprising
providing a second collaborative Concept-Space-Graph storing second collaborative data, wherein the second collaborative Concept-Space-Graph is reachable by a second set of Users comprising the first User and second subset of Users;
associating the second collaborative Concept-Space-Graph to the first Item; and
updating the second collaborative data based on the operation on the Item only if the Item is associated with the second collaborative Concept-Space-Graph.

5. The method of claim 4, further comprising having the first Concept-Space synchronized simultaneously with the first collaborative Concept-Space-Graph and the second collaborative Concept-Space-Graph, thereby having the first Concept-Space being able to show at the same time Items associated with the first collaborative Concept-Space-Graph and Items associated with the second collaborative Concept-Space-Graph.

6. The method of claim 1, further comprising registering a graph change over the first Item performed by the User, wherein a graph change results in the first Item switching between
a) the first Item not being associated with the first collaborative Concept-Space-Graph, thus the first Item being visible to the first User but not visible to the first subset of Users; and
b) the first Item being associated with the first collaborative Concept-Space-Graph, the Item being visible to the Users of the first set of Users.

7. The method of claim 1, wherein first collaborative data comprises Other-User pointer data registered on another computing device operated by a User of the first subset of Users, wherein the method further comprises displaying a pointer replicating movements of the Other-User pointer in the Concept-Space.

8. A computer-implemented method of providing a collaborative User Interface (UI) on a computing device comprising a display, the computing device being operated by a first User, the method implemented on the computing device comprising:
exchanging first collaborative data with a computerized system that maintains a first collaborative Concept-Space-Graph reachable by a first set of Users comprising the first User and first subset of Users;
generating a Viewport to be displayed on the display of the computing device, the Viewport comprising a first Concept-Space;
having a first Item present in the first Concept-Space, wherein the first Item is either a) a first collaborative Item associated to the first collaborative Concept-Space-Graph thus visible to Users of the first set of Users or b) an Item not associated with the first collaborative Concept-Space-Graph, thus visible to the first User but not visible to the Users of the first subset of Users;
registering an operation performed by the first User on the first Item, wherein the operation is either visible or not by the Users of the first subset of Users based on the first Item being a first collaborative Item or not; and
updating the first collaborative data based on the operation on the first Item only if the first Item is a first collaborative Item,
wherein the first collaborative data comprises one of a) audio stream, video data, text data, and execution code, and b) graphic representation,
the computer-implemented method further comprising:
having a second Item and a third item;
linking the first Item to the second item; and
linking the second Item to the third Item, therethrough having a linkage between the first Item and the third Item with the second Item being an intermediary Item in the linkage in the Concept-Space;
having a fifth Item;
inserting the fifth Item in the second Item, therethrough having a linkage between the fifth Item and the third Item with the second Item being an intermediary Item in the linkage;
computing a neighboring level based on determination of a minimum number of intermediary items in a linkage,
establishing a neighboring level for all linkages of items in the first Concept-Space;
establishing an output level based on the neighboring level for each of the items;
generating an audio output for each of the linked items based on their audio stream and modulated according to their output level;
generating a combined audio output by combining the audio output of each of the linked items; and
playing the combined audio output on the computing device.

9. The method of claim 8, further comprising generating a $n^{th}$ Item; and
storing the $n^{th}$ Item in the first Item, wherein the step of updating the first collaborative data and the first collaborative data is based on the Item and the first Item and the $n^{th}$ Item being associated with the first collaborative Concept-Space-Graph or not.

10. The method of claim 9, further comprising, upon the first User zooming in on the first Item over a threshold value, generating and displaying a new Concept-Space displaying the $n^{th}$ Item and not the first Item.

11. The method of claim 8, wherein the step of generating the Viewport comprises displaying another Concept-Space simultaneously with displaying the Concept-Space.

12. The method of claim 8, further comprising having a sixth item, wherein the first Item is associated with the first collaborative Concept-Space-Graph and the sixth item is not associated with the first collaborative Concept-Space-Graph, and linking the first item to the sixth item whereby generating a linkage between two Concept-Space-Graphs.

13. The method of claim 8, wherein the first Item is a Container Item.

14. The method of claim 8, further comprising
providing a private Concept-Space-Graph storing private data reachable only by the first User;
associating the private Concept-Space-Graph to the first Item, thus being therethrough a private Item; and
updating the private data based on the operation on the first Item only if the first Item is a private Item.

15. The method of claim 14, further comprising having the first Concept-Space synchronized simultaneously with the first collaborative Concept-Space-Graph and the private Concept-Space-Graph, thereby having the first Concept-Space being able to show at the same time first collaborative Items and private Items.

16. The method of claim 8, further comprising
providing a second collaborative Concept-Space-Graph storing second collaborative data, wherein the second collaborative Concept-Space-Graph is reachable by a second set of Users comprising the first User and second subset of Users;
associating the second collaborative Concept-Space-Graph to the first Item; and
updating the second collaborative data based on the operation on the Item only if the Item is associated with the second collaborative Concept-Space-Graph.

17. The method of claim 16, further comprising having the first Concept-Space synchronized simultaneously with the first collaborative Concept-Space-Graph and the second collaborative Concept-Space-Graph, thereby having the first Concept-Space being able to show at the same time Items associated with the first collaborative Concept-Space-Graph and Items associated with the second collaborative Concept-Space-Graph.

18. The method of claim 8, further comprising registering a graph change over the first Item performed by the User, wherein a graph change results in the first Item switching between
a) the first Item not being associated with the first collaborative Concept-Space-Graph, thus the first Item being visible to the first User but not visible to the first subset of Users; and
b) the first Item being associated with the first collaborative Concept-Space-Graph, the Item being visible to the Users of the first set of Users.

19. The method of claim 8, wherein first collaborative data comprises Other-User pointer data registered on another computing device operated by a User of the first subset of Users, wherein the method further comprises displaying a pointer replicating movements of the Other-User pointer in the Concept-Space.

* * * * *